US006919848B2

(12) United States Patent
Ishibayashi et al.

(10) Patent No.: US 6,919,848 B2
(45) Date of Patent: Jul. 19, 2005

(54) ANTENNA APPARATUS FOR VEHICLE

(75) Inventors: Katsushiro Ishibayashi, Shinagawa-ku (JP); Tatsuaki Taniguchi, Aki-gun (JP); Kazuo Shigeta, Aki-gun (JP)

(73) Assignees: Harada Industry Co., Ltd., Tokyo (JP); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/601,769

(22) Filed: Jun. 24, 2003

(65) Prior Publication Data

US 2004/0217906 A1 Nov. 4, 2004

(30) Foreign Application Priority Data

Jun. 25, 2002 (JP) ....................................... 2002-185029
Sep. 30, 2002 (JP) ....................................... 2002-287323

(51) Int. Cl.[7] .................................................. G01Q 1/32
(52) U.S. Cl. ...................................................... 343/711
(58) Field of Search ................................ 343/713, 711, 343/712, 714

(56) References Cited

U.S. PATENT DOCUMENTS 4,749,999 A * 6/1988 Hayashi ...................... 343/713
5,268,700 A 12/1993 Hirotsu et al.
5,353,039 A 10/1994 Tsukada et al.
5,499,034 A 3/1996 Fujii et al.
5,526,003 A * 6/1996 Ogawa et al. ....... 343/700 MS
5,610,618 A 3/1997 Adrian et al.
5,714,959 A * 2/1998 Troy et al. .................. 343/713
5,945,956 A 8/1999 Izawa et al.
6,211,831 B1 * 4/2001 Nagy et al. ................. 343/713
6,317,090 B1 * 11/2001 Nagy et al. ................. 343/713
6,329,950 B1 * 12/2001 Harrell et al. ....... 343/700 MS

FOREIGN PATENT DOCUMENTS

DE 195 35 250 3/1997
DE 196 36 584 3/1998
EP 0 797 268 A2 9/1997
JP 60-048601 3/1985
JP 3-054902 3/1991
JP 2001-326515 11/2001

OTHER PUBLICATIONS

Patent Abstracts of Japan vol. 2000, No. 14, Mar. 5, 2001, & JP 2000 323914 A (Central Glass Company) Nov. 24, 2000.
European Search Report Dated Sep. 29, 2003.

* cited by examiner

*Primary Examiner*—Shih-Chao Chen
*Assistant Examiner*—Huedung X. Cao
(74) *Attorney, Agent, or Firm*—Nixon Peabody LLP; Donald R. Studebaker

(57) ABSTRACT

In an antenna apparatus for a vehicle, the antenna apparatus being provided on the vehicle in which at least a part of an outside plank panel of the vehicle is constituted by an outer panel made of a synthetic resin material, the antenna apparatus has at least one non-earthed type antenna, the non-earthed type antenna is provided with a first antenna element connected to an inner conductor of a coaxial cable via a first feeding point, and a second antenna element connected to an outer conductor of the coaxial cable via a second feeding point, and at least both the first and second antenna elements and both the first and second feeding points are arranged in a portion which is inside the outer panel made of the synthetic resin material and is apart from the earthed conductor on the part of the vehicle body, thereby it is possible to improve a receiving performance of a radio wave having a short wavelength, and can restrict an influence of a noise.

12 Claims, 12 Drawing Sheets

ANTENNA APPARATUS FOR VEHICLE

BACKGROUND OF THE INVENTION

1. Field of the Invention

The present invention relates to an antenna apparatus for a vehicle, for example, mounted on a vehicle such as a motor vehicle or the like.

2. Description of the Prior Art

As an antenna apparatus provided in the vehicle such as a motor vehicle or the like, a so-called earthed type antenna is conventionally general In this earthed type antenna, a portion on and after a connection portion between a conductor of a coaxial line for the antenna and an earth wire, in other words, a portion from a branch point against the earth wire to a leading end of an antenna element, forms an actual receiver. That is, a receivable portion is provided in addition to the antenna element.

In this case, as a subject to be received by the antenna apparatus for the vehicle, there can be listed up at least an AM radio broadcast wave, an FM radio broadcast wave, a TV broadcast wave and the like. Frequencies of these radio waves are greatly different such that a frequency of the AM radio broadcast wave is about 1 MHz, a frequency of the FM radio broadcast wave is about 76 to 90 MHz, and a frequency of the TV (television) broadcast wave is about 90 to 108 MHz at least in a low band and about 170 to 225 MHz in a high band. Accordingly, wavelengths thereof are greatly different such that a wavelength of the AM radio broadcast wave is about 300 m, a wavelength of the FM radio broadcast wave is about 3 m, and a wavelength of the TV broadcast wave is about 3 m to 60 cm, respectively.

Since it is considered to be ideal that a length of the antenna is a quarter of a wavelength (λ) of the received radio wave, an ideal antenna length is about 15 cm in the case of the TV broadcast wave (UHF wave) having the shortest wavelength among the waves mentioned above. That is, an ideal antenna length is greatly different in correspondence to the subject to be received.

By the way, in the case of the earthed type antenna, since the receivable portion is provided in addition to the antenna element as mentioned above, the other receivable portion than the antenna element becomes long in the case that a distance from the antenna element to an earthed vehicle body is long, and an antenna receiving characteristic is greatly affected at a time of receiving a radio wave having a short wavelength. For example, the ideal antenna length for receiving the UHF is about 15 cm as mentioned above, however, an actual antenna length at a time of being mounted on the vehicle greatly deflects from this value. Accordingly, it is hard to receive the radio wave having a short wavelength such as the UHF or the like, and in the worst case, there is a risk that it can not be received.

For example, in the case of a glass antenna provided in a rear window, only a distance from the earthed portion on the part of the vehicle body to a window glass is frequently more than 15 cm. Therefore, taking the receipt of the UHF into consideration, only this distance is more than the ideal antenna length. Accordingly, in the conventional art, with respect to receiving the radio wave having a high frequency, it is possible to correspond to the receipt by tuning in correspondence to a vehicle type, however, in order to obtain a good antenna characteristic, there is a problem that a lot of trouble is taken for tuning.

In this case, a pole antenna of the vehicle is of an earthed type, however, in this case, since a distance to the earthed vehicle body is very short, an influence of the other receivable portion than the antenna element is restricted minimum.

In relation to the problem mentioned above, it can be considered that the antenna for the vehicle is set to a non-earthed type. In this case, without being particularly interested in the influence of the other receivable portion than the antenna element at a time of receiving the radio wave having a high frequency, for example, there is disclosed in Japanese Patent Laid-Open Publication No. 2001-326515 a structure in which the non-earthed type glass antenna is applied to the glass antenna provided in the rear window.

However, in this conventional structure, since the antenna element is provided dose to the earthed conductor on the part of the vehicle body such as a vehicle body member and a heating filament, there is a hard point that the antenna element is easily affected by a noise.

By the way, in recent years, with regard to an opening and closing body such as a back door and the like and a kind of vehicle body member such as a rear spoiler, a bumper and the like, a structure in which at least an outside plank (a door outer panel or a bumper face) is made of a synthetic resin is put to practical use, in response to an increased request for reducing a weight of the vehicle body.

As mentioned above, in the case that at least the outside plank is made of the resin corresponding to the electrically non-conductive material, with regard to the vehicle body member such as the back door, the rear spoiler, the bumper or the like, it can be considered that an antenna apparatus is provided in an inner portion of the vehicle body member by utilizing the member.

For example, in Japanese Patent Laid-Open Publication No. H10-242733, there is disclosed a structure in which an antenna apparatus is mounted to an inner portion of a rear spoiler made of a synthetic resin.

However, in the case that the antenna apparatus is provided in the inner portion of the vehicle body member mentioned above, it is generally hard to secure a proper antenna length, in connection to a limited space for arrangement.

Then, as one of countermeasure for such a problem, there can be considered that an "L-type antenna" is formed by bending a leading end side of a so-called monopole antenna approximately at right angles.

FIG. 12 shows an example of such an L-type antenna apparatus 80. In this L-type antenna 80, the antenna of the L-type is constituted by a first antenna element E81 extending in a width direction (an up and down direction in FIG. 12) of an antenna substrate 89 from a feeding point Sj of a feeder Fj, and a second antenna element E82 formed so as to be bent at right angles from an end portion of the first antenna element E81.

In this case, in the example shown in FIG. 12, a length of the first antenna element E81 is set, for example, to 100 mm, and a length of the second antenna element E82 is set, for example, to 500 mm, respectively, and an entire length of the antenna is 600 mm.

However, in the antenna apparatus 80 shown in FIG. 12, there is a problem that a good receiving property is exhibited with respect to the FM (radio) broadcast wave, however, a sensitivity comes short with respect to the AM (radio) broadcast wave because the length of the antenna element is short.

Therefore, as shown in FIG. 13, it can be considered that a receiving sensitivity with respect to the AM broadcast wave is improved by extending the second antenna element while maintaining the length (100 mm) of the first antenna element E91 (the extended length of the second antenna element E 92 is 740 mm).

In this case, the entire length of the antenna is 840 mm, so that it is possible to improve the receiving sensitivity with respect to the AM broadcast wave, however, a necessary space in a longitudinal direction of the antenna substrate 99 is increased. Further, there is generated a problem that the receiving sensitivity with respect to the FM broadcast wave is reduced due to an impedance mismatch. In this case, as shown in FIG. 13 mentioned above, the antenna obtained by extending the second antenna element on the basis of the L-type antenna 80 shown in FIG. 12 is called as an "L-type extended antenna" 90.

In connection to this problem, for example, it can be considered to improve the receiving sensitivity with respect to the AM broadcast wave while maintaining the receiving sensitivity with respect to the FM broadcast wave, by adding a coil fox passing the AM frequency band and blocking the FM frequency band to a leading end of the second antenna element E82 in FIG. 12 and adding an antenna element for extension to a leading end of the coil.

However, in this case, there are problems that an antenna structure becomes complex and a manufacturing cost becomes high.

The problem about compatibility in the receiving sensitivity as mentioned above is not limited to the case between the FM broadcast wave and the AM broadcast wave, but exists unavoidably in the case that one antenna receives a plurality of radio waves having different frequencies, for example, the case between the low band and the high band (VHF/High and Low) of the TV (television) broadcast wave or the like.

SUMMARY OF THE INVENTION

This invention is made by taking the technical problems mentioned above into consideration, and one of basic objects of this invention is to provide an antenna apparatus for a vehicle which can improve a receiving performance of a radio wave having a short wavelength, and can restrict an influence of a noise. The other basic object of the present invention is to provide an antenna apparatus for a vehicle which can achieve a compatibility of a receiving sensitivity without causing a complex antenna structure and a special increase of a manufacturing cost, in the case of receiving a plurality of radio waves having different frequency by an antenna having a limited placing space.

In order to achieve the other basic object mentioned above, the inventors of the present invention have carried on various kinds of researches and developments, and have found that a comparatively good receiving property around a considerably wide receivable frequency band by setting the antenna pattern to the T-type or the F-type, and that an antenna pattern having a very good efficiency and an excellent receiving property can be obtained in the case that different receivable frequency bands are constituted by the T-type antenna, for example, by setting a coefficient changing in connection to a magnification of the frequency under a predetermined condition such that a so-called VSWR (Voltage Standing Wave Ratio) is maintained equal to or less than a fixed value, and designing the antenna using the coefficient.

In accordance with a first aspect of the present invention, there is provided an antenna apparatus for a vehicle, the antenna apparatus being provided on the vehicle in which at least a part of constituent members of the vehicle is made of an electrically non-conductive material, wherein the antenna apparatus has at least one non-earthed type antenna, the non-earthed type antenna is provided with a first element connected to an inner conductor of a coaxial line via a first connection point, and a second element connected to an outer conductor of the coaxial line via a second connection point, and at least both the first and second elements and both the first and second connection points are arranged in a portion which is inside the outer panel made of the electrically non-conductive material and is apart from the earthed conductor on the part of the vehicle body.

According to the first aspect of the present invention, since the non-earthed type antenna is employed, there is no risk that the antenna receiving performance is reduced, this risk being generated in the conventional structure employing the earthed type antenna, even in the case that the distance from the antenna element to the vehicle body is long. And in particular, it is possible to stably improve the antenna receiving performance at a time of receiving the radio wave having the short wavelength. Further, since at least both the first and second elements and both the first and second connection points are arranged in the portion apart from the earthed conductor on the part of the vehicle body, it is possible to restrict the influence of the noise. Further, since at least both the first and second elements and both the first and second connection points are arranged in the inner side of the constituent member made of the electrically non-conductive material, it is possible to prevent the antenna apparatus from being visible from the outer portion of the vehicle without deteriorating the receiving performance, thereby contributing to the improvement of outer appearance of the vehicle.

In one embodiment of the present invention, a leader portion of the coaxial line for said non-earthed type antenna to said first and second connection points is drawn out in a different direction from respective extending directions of said first and second elements.

In this case, the first and second elements do not extend along the leader portion corresponding to the portion closest to the coaxial line, because the leader portion of the coaxial line for the non-earthed type antenna to the first and second connection points is drawn in the different direction from each of the extending direction of the first and second elements. Therefore, it is possible to effectively restrict the influence of the coaxial line applied to each of the elements, and it is possible to further improve the receiving performance of the non-earthed type antenna.

In one embodiment of the present invention, antenna apparatus is provided with at least one earthed type antenna, wherein the outer conductor of the coaxial line for said earthed type antenna is earthed on the vehicle body.

In this case, since at least one earthed type antenna is further provided, it is possible to receive the wider frequency band in conjunction with the non-earthed type antenna.

In one embodiment of the present invention, said earthed type antenna is set so as to cover a lower frequency band than a receivable frequency band of said non-earthed type antenna.

In this case, it is possible to better receive the radio wave by using the optimum antenna in correspondence to the frequency band, at a time of receiving the radio wave having the wider frequency band, because the receivable frequency band of the earthed type antenna is set to the frequency band which can cover the lower frequency band than the receivable frequency band of the non-earthed type antenna.

In one embodiment of the present invention, the coaxial line for said earthed type antenna is structured such that the inner conductor is covered with the outer conductor at least a part of a range from the earthed portion to a feed portion.

In this case, it is possible to restrict the influence of the coaxial line for the non-earthed type antenna applied to the coaxial line for the earthed type antenna, even in the case that the coaxial line for the non-earthed type antenna and the coaxial line for the earthed type antenna which are provided in conjunction with each other are comparatively close to each other. That is, it is possible to accurately prevent the receiving property from being dispersed by the mounting state of each of the coaxial lines for the antennas, and it is possible to stabilize the receiving performance of the earthed type antenna.

In one embodiment of the present invention, respective feed portions to said non-earthed type antenna and the earthed type antenna are connected to coaxial lines for the respective antennas by one connector.

In this case, it is possible to connect the antennas by the single connector even in the case that a plurality of antennas are provided, so that it is possible to inhibit the number of the connector parts from being increased, and it is possible to improve the assembling property in the vehicle, thereby contributing to the cost reduction.

In one embodiment of the present invention, the coaxial lines for the respective antennas connected to the respective feed portions to said non-earthed type antenna and the earthed type antenna are cramped on the part of the vehicle body at least in a part of the coaxial lines by a holding member.

In this case, it is possible to cramp the coaxial lines of the antennas on the part of the vehicle body by bundling at least a part of the coaxial lines by the holding member even in the case that the different kinds of antennas are provided, so that it is possible to improve the assembling property in the vehicle.

In accordance with a second aspect of the present invention, there is provided an antenna apparatus for a vehicle, having a feeder line and antenna elements connected to said feeder line, and said antenna apparatus being provided on the vehicle in which at least a part of constituent members of the vehicle is made of an electrically non-conductive material, wherein said antenna elements are provided with a first antenna element which extends in a direction moving apart from a vehicle body, and a second antenna element and a third antenna element which are branched from said first antenna element and extend in substantially reverse directions to each other in a direction crossing to the first antenna element.

According to the second aspect of the present invention, the antenna function corresponding to a plurality of antennas having the different lengths can be provided by the antenna portion obtained by combining the first and second antenna elements or the antenna portion obtained by combining the first and third antenna elements, and the antenna constituted by all the first to third antenna elements, whereby it is possible to correspond to the receipt of a plurality of radio waves having the different frequencies by one antenna pattern. That is, even in the case that the installation space for the antenna is limited, it is possible to achieve all the receiving sensitivities of a plurality of receiving frequencies, by suitably setting the lengths of the respective first to third antenna elements. In this case, since it is possible to correspond without adding any other parts such as the specific coil or the like than the antenna elements, it is avoidable to make the antenna structure complex and increase the manufacturing cost.

In one embodiment of the present invention, said antenna elements are provided with a fourth antenna element which folded back in an approximately perpendicular direction from a terminal portion of said third antenna element.

In this case, it is possible to extend the antenna length without increasing the length in the extending direction of the second and third antenna elements which is generally the longest, and it is possible to obtain the antenna apparatus which is advantageous in view of saving the space.

In one embodiment of the present invention, said antenna elements are formed in an approximately T-shaped as a whole by a first antenna element, a second antenna element and a third antenna element, a low frequency band is constituted by said first antenna element and the second antenna element, a high frequency band is constituted by said first antenna element and the third antenna element, and a length of said third antenna element is set on the basis of a value obtained by multiplying a length of said second antenna element by a predetermined coefficient.

In this case, since the antenna pattern is formed in the approximately T-shaped as a whole by the first to third antenna elements, the same effect as that of the second aspect of the present invention mentioned above can be achieved with respect to achieving all the receiving sensitivities of a plurality of receiving frequencies without particularly making the antenna structure complex and increasing the manufacturing cost, within the limited installation space. Further, since the length of the third antenna element is set on the basis of the value obtained by multiplying the length of the second antenna element by the predetermined coefficient, at a time of constructing the antenna portion corresponding to the low frequency band area by the first antenna element and the second antenna element and constructing the antenna portion corresponding to the high frequency band area by the first antenna element and the third antenna element, the antenna can be easily designed, and it is possible to very efficiently obtain the antenna pattern which is excellent in the receiving property of both the frequency bands.

In one embodiment of the present invention, said predetermined coefficient is changed in correspondence to a magnification of a frequency of said high frequency band with respect to a frequency of said low frequency band.

In this case, it is possible to very efficiently obtain the antenna pattern which is excellent in the receiving property of both the frequency bands, by using the predetermined coefficient which is changed in correspondence to the magnification of the frequency of the high frequency band with respect to the frequency of the low frequency band.

In one embodiment of the present invention, said predetermined coefficient becomes smaller in accordance with an increase of said magnification.

In this case, the above-mentioned effect can be achieved by using the predetermined coefficient which becomes smaller in accordance with the increase of the magnification In one embodiment of the present invention, said constituent member made of an electrically non-conductive material is an outer panel of an opening and closing body for opening and closing an opening of the vehicle body.

In this case, it is possible to mount the antenna by utilizing the opening and closing body for opening and closing the opening of the vehicle body.

In one embodiment of the present invention, said constituent member made of an electrically non-conductive material is an air spoiler.

In this case, it is determined in correspondence to with or without the air spoiler, that is, in correspondence to the vehicle type or the specification whether or not the antenna apparatus is provided. Therefore, it is not necessary to determined whether or not the antenna apparatus is required.

In one embodiment of the present invention, said constituent member made of an electrically non-conductive material is a bumper face.

In this case, it is possible to mount the antenna by utilizing the bumper face which is to be attached later to the vehicle body, also it is possible to prevent the antenna apparatus from being visible from the outer portion of the vehicle without deteriorating the receiving performance, thereby contributing to the improvement of outer appearance of the vehicle.

In one embodiment of the present invention, said constituent member made of an electrically non-conductive material is a window portion.

In this case, since at least both the first and second elements and both the first and second connection points are arranged in the window portion made of the electrically non-conductive material, it is possible to place the antenna so as to be excellent in the receiving performance by utilizing the window portion in which the receivable range is comparatively wide.

In one embodiment of the present invention, said antenna elements are mounted to a window glass of the window portion.

In this case, it is possible to mount the antenna by utilizing the window glass of the vehicle which has the wide receivable range.

In one embodiment of the present invention, said electrically non-conductive material is a synthetic resin material.

In this case, the same effects as those in any one of the inventions mentioned above can be achieved, in the case that the synthetic resin material is employed for the electrically nonconductive material.

In one embodiment of the present invention, said antenna elements are arranged on an antenna substrate formed in a thin plate, and is mounted to a vehicle body member via said antenna substrate.

In this case, it is possible to easily and securely mount the antenna in comparison with the case that the antenna is directly mounted to the vehicle body member.

DESCRIPTION OF THE PREFERRED EMBODIMENTS

A description will be in detail given below of embodiments in accordance with the present invention with reference to the accompanying drawings.

Figure 1:
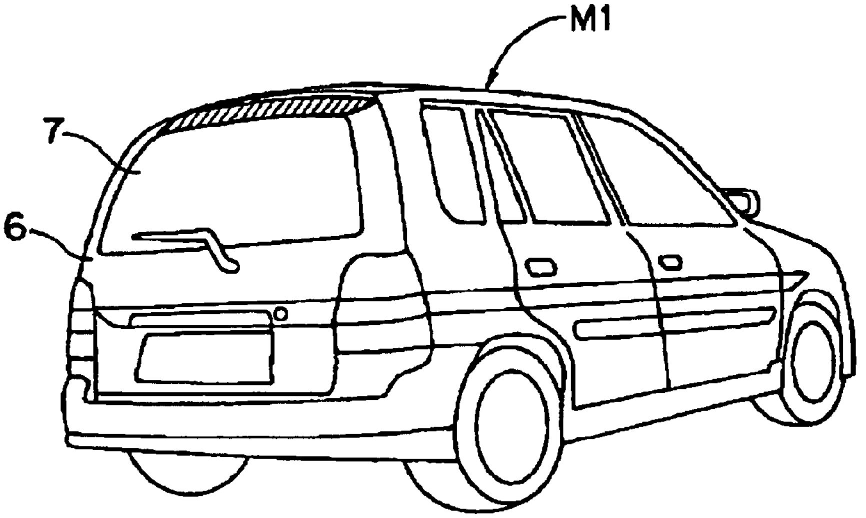
FIG. 1 is a perspective view showing a vehicle rear portion of a motor vehicle provided with an antenna apparatus for a vehicle in accordance with an example 1 of a first embodiment of the present invention.

First, a description will be given of a first embodiment in accordance with the present invention. FIG. 1 is a perspective view showing a vehicle rear portion of a motor vehicle provided with an antenna apparatus for a vehicle in accordance with an example 1 of the present embodiment, and FIG. 2 is a vertical cross sectional explanatory view showing a mounting structure of the antenna for the vehicle to the vehicle (specifically, to a rear gate).

As shown in FIG. 1, in a motor vehicle M1 in accordance with the present embodiment, a rear gate 6 is provided as an opening and closing body for opening and closing an opening portion leaving a rear portion of a vehicle cabin open to a rear side, and an antenna is mounted to the rear gate 6. It is to be noted that, in FIG. 1, a position of an antenna mounting portion in the rear gate 6 is schematically shown by a hatched line.

Figure 2:
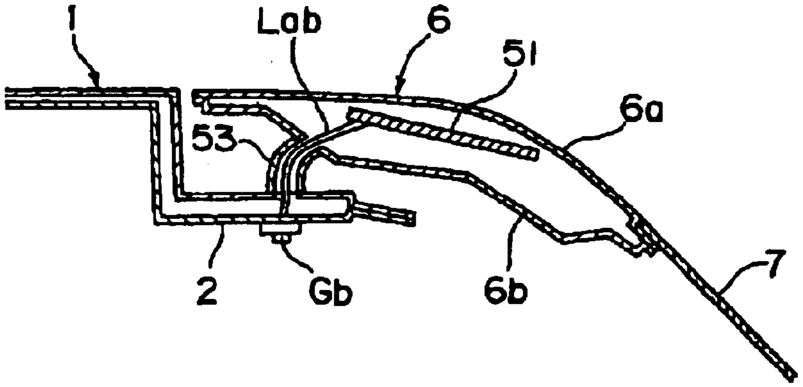
FIG. 2 is a vertical cross sectional explanatory view showing a mounting structure of the antenna for the vehicle in accordance with the example 1 to a rear gate.

The rear gate 6 mentioned above is formed by combining an outer panel 6*a* constituting a gate outside plank and an inner panel 6*b* constituting a gate inside plank and bonding outer peripheral edge portions thereof, as is well known from FIG. 2, and a window glass 7 is attached to a window opening portion in a center thereof.

A vehicle body rear end member 2 extending in a vehicle width direction is provided in an upper portion of a rear end of the vehicle body 1 in the motor vehicle M1, and a hinge mechanism is mounted to the rear end member 2, which is not particularly illustrated. The rear gate 6 is supported so as to freely rotate in an up and down direction via a hinge mechanism (not shown), and is structured such as to open and close the opening portion in the rear portion of the vehicle cabin.

In accordance with the example 1 of the present embodiment, at least the outer panel 6*a* (preferably, both the outer panel 6*a* and the inner panel 6*b*) of the rear gate 6 is manufactured by a molding work using a synthetic resin material as the electrically non-conductive material. Further, in the upper portion of the rear gate 6 (refer to the hatched portion in FIG. 1), an antenna substrate 51 of the antenna apparatus is arranged in an inner side of the outer panel 6*a*, that is, within a space portion formed by the outer panel 6*a* and the inner panel 6*b*.

The antenna substrate 51 is formed in a plate shape, for example, using an electrically non-conductive material such as a resin material or the like, and is fixed to a side of an inner face of the outer panel 6*a*, for example, using an adhesive agent. In this case, the antenna substrate 51 may be fixed to the inner surface of the outer panel 6*a*, for example, in accordance with the other known methods such as a screwing or the like. Further, the antenna substrate 51 may be fixed to the inner panel 6*b*.

Figure 10:
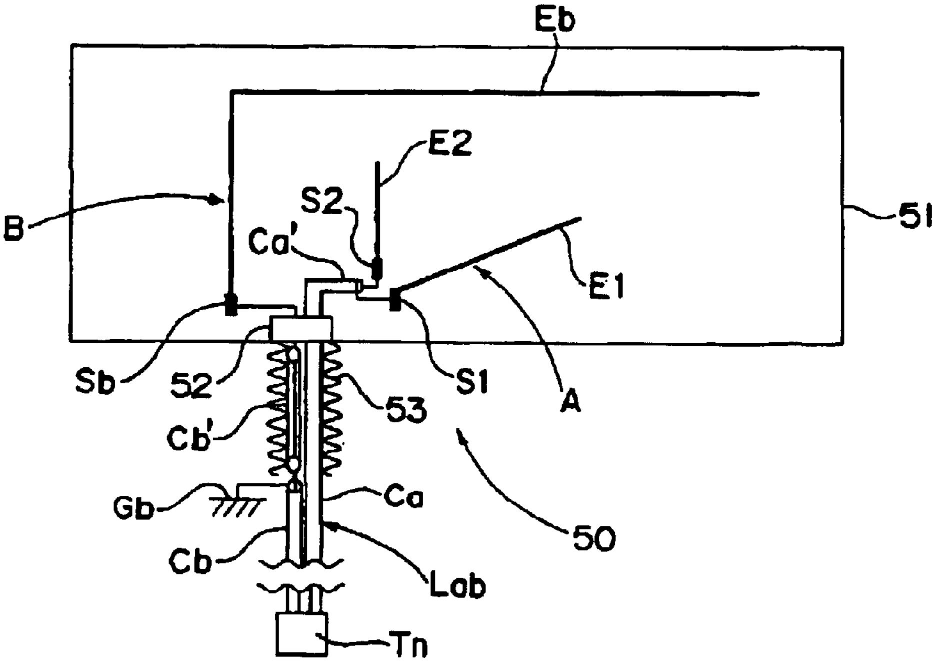
FIG. 10 is an explanatory view schematically showing a structure of the antenna apparatuses in accordance with the first embodiments of the present invention.

FIG. 10 is an explanatory view schematically showing a structure of the antenna apparatus in accordance with the present embodiment. As shown in FIG. 10, the antenna apparatus 50 is provided with one non-earthed type antenna A and one earthed type antenna B on the antenna substrate 51.

In the non-earthed type antenna A mentioned above, an coaxial cable Ca feeding an electric current to antenna elements E1 and E2 of the antenna A is extended from a tuner Th. The coaxial cable Ca is not particularly illustrated in a structure thereof, however, is the same as the conventionally known one, and is provided with an inner conductor and an outer conductor.

The first antenna element E1 is connected to the inner conductor of the coaxial cable Ca via a first feeding point S1, and the second antenna element E2 is connected to the outer conductor via a second feeding point S2. The coaxial cable Ca mentioned above is fastened to the antenna substrate 51 via a connector 52, and then, is connected to the first and second feeding points S1 and S2 via a leader portion Ca' which is drawn out from an extending direction.

As is well known from FIG. 10, the leader portion Ca' of the coaxial cable Ca for the non-earthed type antenna to the first and second feeding points S1 and S2 is drawn out in a different direction (a lateral direction in FIG. 10) from the respective extending direction of the first and second antenna elements E1 and E2.

The above-described antenna substrate 51 is built in the inner side of the synthetic resin outer panel 6*a* (specifically, within the space between the outer panel 6*a* and the inner panel 6*b*) in the rear gate 6 as shown in FIG. 2, and at least both the first and second antenna elements E1 and E2 and both the first and second feeding points S1 and S2 are arranged in a portion which is apart from the earthed conductor part of the vehicle body.

As described above, in the antenna apparatus 50 for the vehicle in accordance with the present embodiment, since the non-earthed antenna A is employed, there is no risk of reduction in the antenna receiving performance even in the case that a distance from the antenna elements E1 and E2 to the vehicle body 1 is long. Especially, it is possible to stably improve the antenna receiving performance at a time of receiving a radio wave having a short wavelength. It forms a contrast to the conventional structure employing the earthed type antenna.

Further, since at least both the first and second antenna elements E1 and E2 and both the first and second feeding points S1 and S2 are arranged in the portion which is apart from the earthed conductor part of the vehicle body, it is possible to restrict the influence of the noise.

Further, since at least both the first and second antenna elements E1 and E2 and both the first and second feeding points S1 and S2 are arranged in the inner side of the outer panel 6*a* made of the electrically non-conductive material (the synthetic resin material), it is possible to prevent the antenna apparatus 50 from being visible from the outer portion of the vehicle M1 without damaging the receiving performance, and it is possible to improve an outer appearance of the vehicle M1.

Further, in particular, the leader portion Ca' of the coaxial cable Ca for the non-earthed type antenna to the first and second feeding points S1 and S2 is drawn out in the different direction from the respective extending directions of the first and second antenna elements E1 and E2. Therefore, these antenna elements E1 and E2 do not extend along the leader portion Ca' corresponding to a closest portion of the coaxial cable Ca, whereby it is possible to effectively restrict the influence of the coaxial cable Ca (specifically, the leader portion Ca' of the coaxial cable Ca) applied to the respective antenna elements E1 and E2, and it is possible to improve the receiving performance of the non-earthed type antenna A.

In the antenna apparatus 50 for the vehicle in accordance with the present embodiment, as mentioned above and as is well known from FIG. 10, at least one earthed type antenna B is further provided in addition to the non-earthed type antenna A, in more preferable. A coaxial cable Cb for the earthed type antenna B is extended from the tuner Th, and an antenna element Eb is connected to an inner conductor thereof via a feeding point Sb. On the other hand, an outer conductor is earthed with respect to the vehicle body 1 by an earthed portion Gb on the part of the vehicle body. This earthed portion Gb on the part of the vehicle body is specifically provided in the rear end member 2 of the vehicle body 1.

Further, the earthed type antenna B is sot so as to cover a lower frequency band than a receivable frequency band of the non-earthed type antenna A.

Since the earthed type antenna B is further provided in addition to the non-earthed type antenna A as mentioned above, it is possible to receive a wider frequency band in conjunction with the non-earthed type antenna A.

In particular, since the receivable frequency band of the earthed type antenna B is set to the frequency band covering the lower frequency band than the receivable frequency band of the non-earthed type antenna A, it is possible to well receive the frequency by using an optimum antenna in correspondence to the frequency band, at a time of receiving the radio wave having the wider frequency band.

Further, in the present embodiment, in particular, the coaxial cable Ca for the non-earthed type antenna and the coaxial cable Cb for the earthed type antenna are cramped on the part of the vehicle body 1 at least in a part thereof, for example, by a bellows-like holding member 53 formed by a rubber or a soft resin.

As mentioned above, at least a part of both the coaxial cables Ca and Cb for the antennas is cramped on the part of the vehicle body by the holding member 53 at a time of arranging the different kinds of antennas A and B. Therefore, it is possible to cramp at least a part of the coaxial cables Ca and Cb of the antennas A and B on the part of the vehicle body 1 by bundling by means of the holding member 53, even in the case of arranging the different kinds of antennas A and B, so that it is possible to improve an assembling property in the vehicle M1.

Further, in particular, in the coaxial cable Cb for the earthed type antenna B, the inner conductor is covered with the outer conductor with respect to at least a part Cb' of the range from the earthed portion Gb on the part of the vehicle body to the feed portion Sb.

Accordingly, even in the case that the coaxial cable Ca for the non-earthed type antenna A and the coaxial cable Cb for the earthed type antenna B which are provided in conjunction with each other are comparatively close to each other, in particular, even in the case that there are cramped in a state in which at least a part of the both is bundled, as shown in FIG. 10, it is possible to effectively restrict the influence of the coaxial cable Cb for the non-earthed type antenna applied to the coaxial cable Ca for the earthed type antenna That is, it is possible to accurately prevent the receiving property from being dispersed by the mounting states of the coaxial cables Ca and Cb for the respective antennas, and it is possible to stabilize the receiving performance of the earthed type antenna B.

Further, each of the feed portions S1, S2 and Sb to the non-earthed type antenna A and the earthed type antenna B is connected to each of the coaxial cables Ca and Cb for the antennas in the outer portion of the antenna substrate 51 by one connector 52.

Therefore, even in the case that a plurality of antennas A and B are provided, they can be connected by only one connector 52, so that it is possible to inhibit the number of the connector parts from being increased, and the assembling property in the vehicle can be improved, thereby contributing to the cost reduction. That is, the feeding to both the non-earthed type antenna A and the earthed type antenna B is achieved by one feed line Lab obtained by combining the coaxial cables Ca and Cb for the respective antennas.

In this case, in the embodiment mentioned above, the structure is made such that the antenna substrate 51 is mounted to the inner side of the synthetic resin-made outer panel 6*a* in the rear gate 6 corresponding to the opening and closing body for opening and closing the opening of the rear portion of the vehicle body, however, the opening and closing body to which the antenna substrate is mounted is not limited to the rear gate, but it is possible to employ the other opening and closing bodies for opening and closing the opening of the rear portion of the vehicle body, for example, a trunk lid or the like. Further, in addition to the opening and closing body mentioned above, the antenna substrate 51 may be mounted to the inner side of the other outer panels formed by a part of the outside plank panel of the vehicle M1 and made of an electrically non-conductive material, for example, an outer panel in a vehicle body pillar portion or the like. Further, the other electrically non-conductive materials than the synthetic resin may be used for the material for the outside plank panel mentioned above.

Next, a description will be given of the other various examples in accordance with the first embodiment of the present invention. In the case, in the following description, the same reference numerals are attached to the elements having the same structures and the same operations as those of the example 1 mentioned above, and a more description will be omitted.

Figure 3:
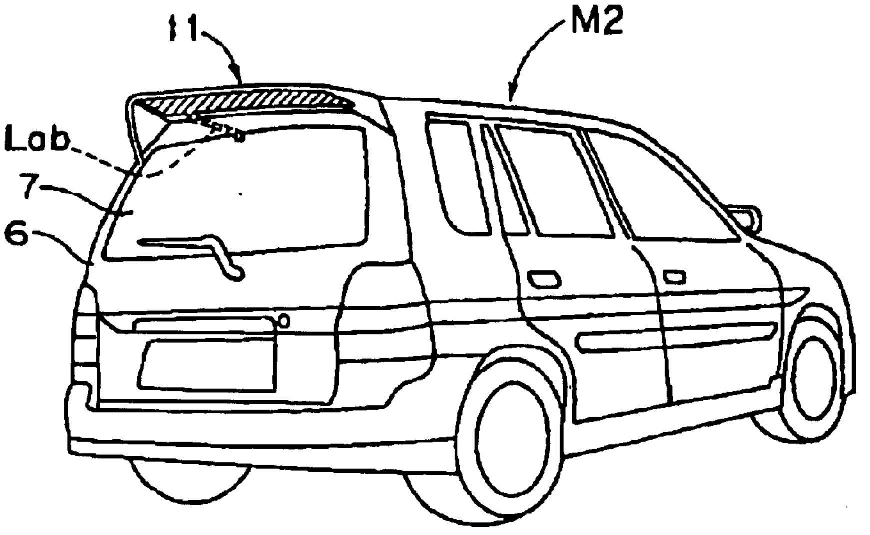
FIG. 3 is a perspective view showing a vehicle rear portion of a motor vehicle provided with an antenna apparatus for a vehicle in accordance with an example 2 of the first embodiment of the present invention.
Figure 4:
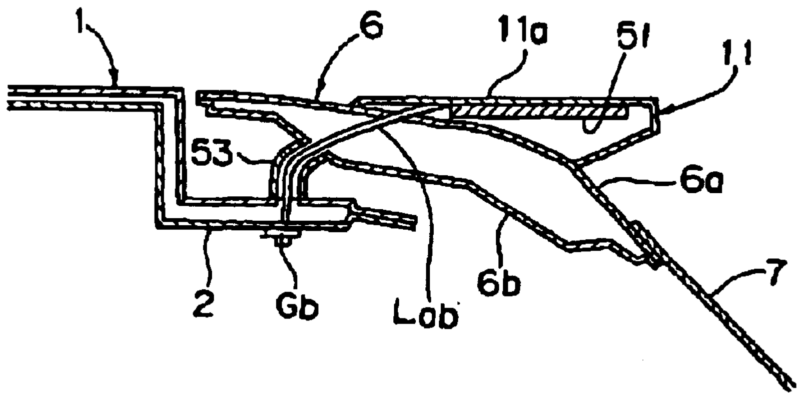
FIG. 4 is a vertical cross sectional explanatory view showing a mounting structure of the antenna for the vehicle in accordance with the example 2 to an air spoiler.

A description will be first given of an example 2 in accordance with the first embodiment of the present invention with reference to FIGS. 3 and 4. As shown in FIG. 3, in a motor vehicle M2 in accordance with the example 2, an air spoiler 11 is provided in an upper portion of the rear gate 6. In this case, in FIG. 3, a position of an antenna mounting portion in the air spoiler 11 is schematically shown by a hatched line.

This air spoiler 11 is formed in a hollow shape by a synthetic resin material corresponding to an electrically non-conductive material, and the same antenna substrate 51 as that in the example 1 is fixed to an inner surface of an outer portion 11*a*.

Accordingly, in the present example 2, the same operations and effects as those of the example 1 can be basically achieved with regard to the antenna property, the assembling property in the vehicle and the like.

In this case, it is determined in correspondence to with or without the air spoiler 11, that is, in correspondence to a vehicle type or a specification whether or not the antenna apparatus 50 is provided. Therefore, it can be known on the basis of only the outer appearance of the vehicle whether or not the antenna apparatus 50 is to be mounted, particularly at a time of assembling the vehicle on a mixed flow line in which various types of vehicles are assembled, so that it is not necessary to take a lot of trouble such as judging by referring to an assembly specification or the like, and there is no risk that an erroneous assembly is carried out.

Figure 5:
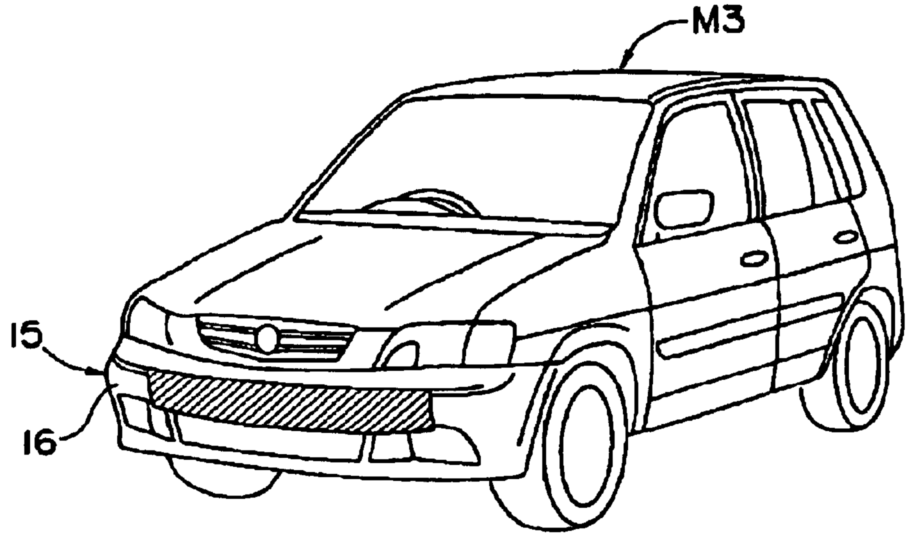
FIG. 5 is a perspective view showing a vehicle front portion of a motor vehicle provided with an antenna apparatus for a vehicle in accordance with an example 3 of the first embodiment of the present invention.
Figure 6:
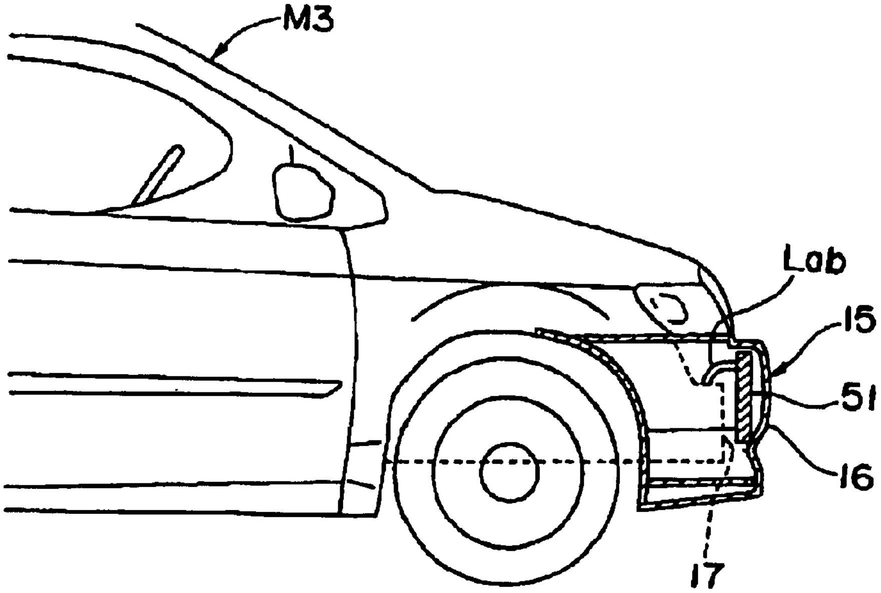
FIG. 6 is a vertical cross sectional explanatory view showing a mounting structure of the antenna for the vehicle in accordance with the example 3.

Next, a description will be given of an example 3 in accordance with the first embodiment of the present invention with reference to FIGS. 5 and 6. As is well known from FIG. 6, in a motor vehicle M3 in accordance with the example 3, the same antenna substrate 51 as that of the example 1 is fixed to an inner portion of a front bumper 15.

The bumper 15 mentioned above is the same as the conventionally known one, has a bumper face 16 made of a synthetic resin material (an electrically non-conductive material) on a surface portion thereof and is provided with a steel-made bumper reinforcement 17 connected to the vehicle body in an inner side thereof.

Further, the same antenna substrate 51 as that of the example 1 is fixed to an inner side of the bumper face 16. In this case, an outer conductor of the coaxial cable Cb of the earthed type antenna B can be earthed on the bumper reinforcement 17. It is to be noted that, in FIG. 5, a position of an antenna mounting portion in the front bumper 15 is schematically shown by a hatched line.

Accordingly, in this example 3, the same operations and effects as those of the example 1 can be basically achieved with regard to the antenna property, the assembling property in the vehicle and the like. In particular, in this case, since the antenna apparatus is arranged in the inner side of the bumper face 16, it is possible to prevent the antenna apparatus 50 from being visible from the outer portion of the vehicle by utilizing the synthetic resin parts which are later attached to the vehicle body without deteriorating the receiving performance, thereby contributing to an improvement of the outer appearance in the vehicle.

Figure 7:
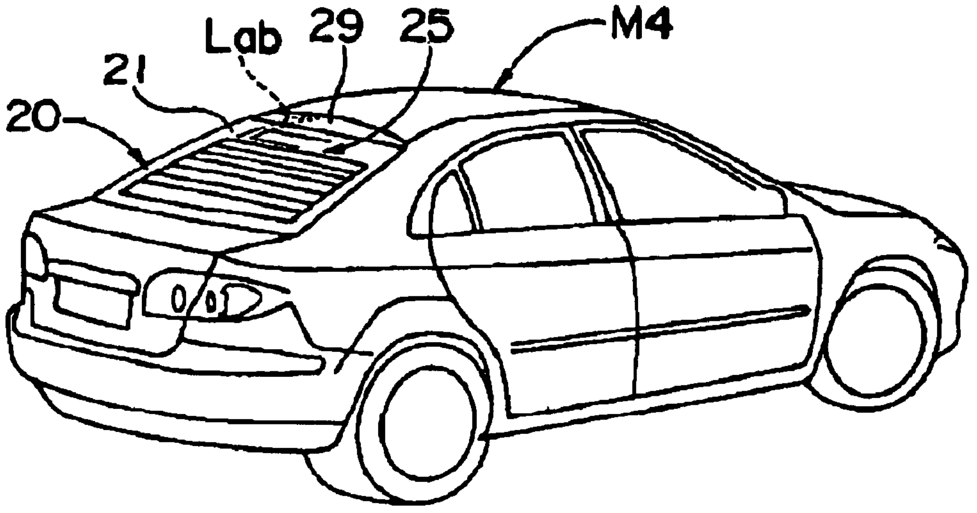
FIG. 7 is a perspective view showing a vehicle rear portion of a motor vehicle provided with an antenna apparatus for a vehicle in accordance with an example 4 of the first embodiment of the present invention.
Figure 8:
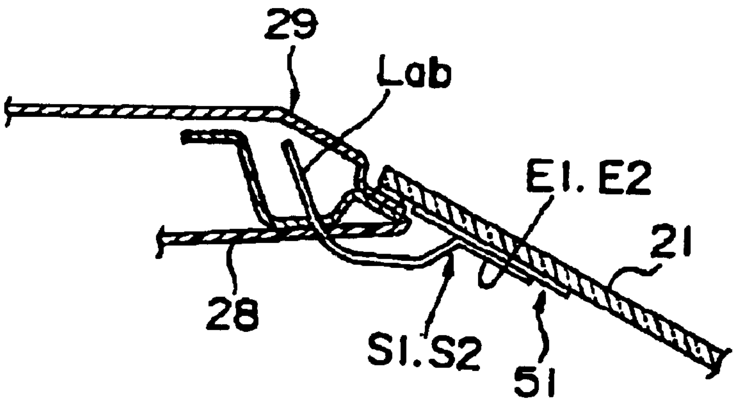
FIG. 8 is a vertical cross sectional explanatory view showing a mounting structure of the antenna for the vehicle in accordance with the example 4.

Next, a description will be given of an example 4 in accordance with the first embodiment of the present invention with reference to FIGS. 7 and 8. As is well known from these drawings, in a motor vehicle M4 in accordance with the example 4, the antenna substrate 51 formed by a substantially transparent resin is attached to a comparatively upper portion of a rear window glass 21 corresponding to an electrically non-conductive member covering a window portion 20 in the rear portion of the vehicle body. An electric current is fed to the antenna substrate 51 from a feed line Lab drawn out from an inner side of a roof trim 28 corresponding to a rear header 29 in the upper portion of the rear end of the vehicle body.

Further, in this case, with regard to the non-earthed type antenna A, since at least both the first and second antenna elements E1 and E2 and both the first and second feeding points S1 and S2 are arranged in a portion which is sufficiently apart from the earthed conductor on the part of the vehicle body in the window portion 20, it is possible to restrict the influence of the noise in comparison with the conventional structure.

That is, in this example 4, the same operations and effects as those of the example 1 can be basically achieved with regard to the antenna property, the assembling property in the vehicle and the like. In particular, in this case, it is possible to place the antenna which is excellent in the receiving performance by utilizing the window portion 20 having the comparatively wide receivable range.

In the examples mentioned above, the electric current is fed to both the non-earthed type antenna A and the earthed type antenna B by one feed line Lab obtained by combining the coaxial cables Ca and Cb for the respective antennas, however, it is possible to feed thereto by independent feed lines.

Figure 9:
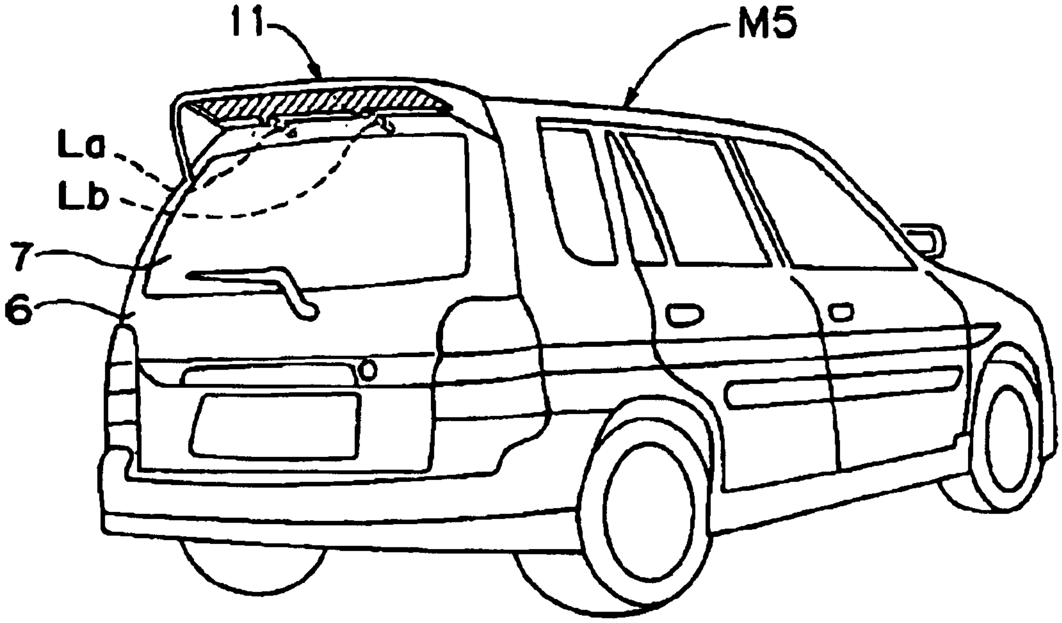
FIG. 9 is a perspective view showing a vehicle rear portion of a motor vehicle provided with an antenna apparatus for a vehicle in accordance with an example 5 of the first embodiment of the present invention.

Further, a description will be given of an example 5 of the first embodiment corresponding to an example in which the electric current is fed by the independent feed lines. FIG. 9 shows an embodiment in which the antenna substrate is mounted to the air spoiler 11 provided in an upper side of a rear portion of a vehicle body in a motor vehicle M5. This air spoiler 11 is the same as that in the example 2 mentioned above, and in FIG. 9, a position of an antenna mounting portion in the spoiler 11 is schematically shown by a hatched line, and reference symbols La and Lb denote independent feed lines.

Figure 11:
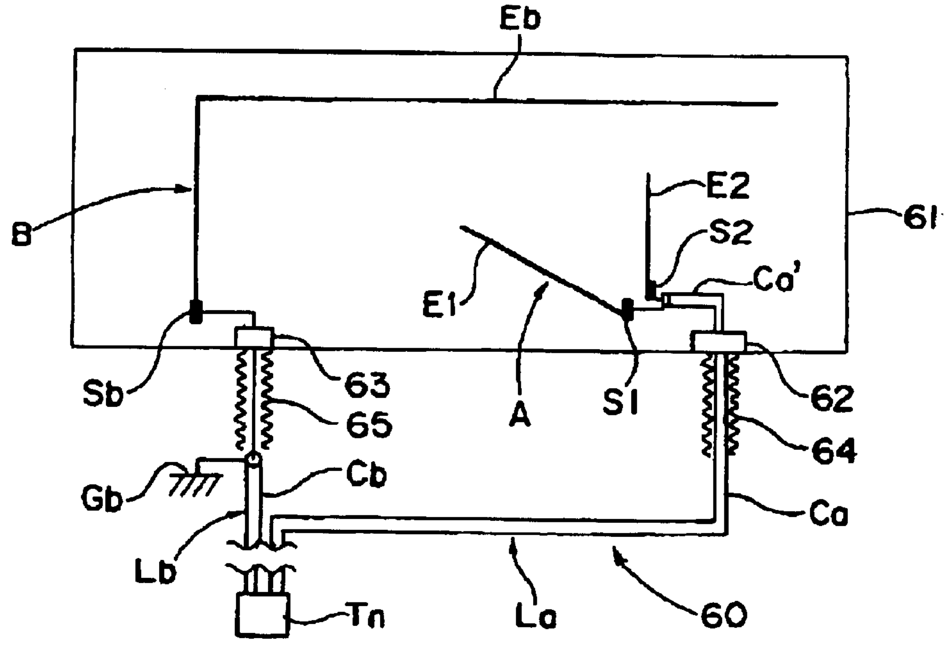
FIG. 11 is an explanatory view schematically showing a structure of the antenna apparatus in accordance with the example 5 of the first embodiment of the present invention.

As shown in FIG. 11, in an antenna apparatus 60 in accordance with the example 5, in the same manner as that shown in FIG. 10, the antenna apparatus 60 is provided with an antenna substrate 61 formed in a plate shape using an electrically non-conductive material, for example, a resin material or the like, and one non-earthed type antenna A and one earthed type antenna B are provided on the antenna substrate 61.

The non-earthed type antenna A is provided with a coaxial cable Ca feeding an electric current to the antenna elements E1 and E2 of the antenna A, the first antenna element E1 is connected to the inner conductor of the coaxial cable Ca via the first feeding point S1, and the second antenna element E2 is connected to the outer conductor via the second feeding point S2.

The coaxial cable Ca mentioned above is fastened to the antenna substrate 51 via a connector 62, and is connected to the first and second feeding points S1 and S2 mentioned above via the leader portion Ca' which is drawn out from an extending direction. Here, even in this case, in the same manner as that of FIG. 10, the leader portion Ca' of the coaxial cable Ca for the non-earthed type antenna to the first and second feeding points S1 and S2 is drawn out in a different direction (a lateral direction in FIG. 11) from each of the extending directions of the first and second antenna elements E1 and E2.

On the other hand, the coaxial cable Cb for the earthed type antenna B is extended apart from the coaxial cable Ca for the non-earthed type antenna, and is fastened to the antenna substrate 61 via a different connector 63 from the connector 62 fastening the coaxial cable Ca for the non-earthed type. An inner conductor of the coaxial cable Cb for the earthed type antenna B is connected to the antenna element Eb via the feeding point Sb. On the other hand, an outer conductor is earthed on the vehicle body 1 by an earthed portion Gb on the part of the vehicle body.

Further, in the same manner as that shown in FIG. 10, a receivable frequency band of the earthed type antenna B is set to a frequency band which covers a lower frequency band than a receivable frequency band of the non-earthed type antenna A.

In this case, the coaxial cable Ca for the non-earthed type antenna A and the coaxial cable Cb for the earthed type antenna B are cramped on the part of the vehicle body at least in a part thereof, for example, by bellows-like holding members 64 and 65. These holding members 64 and 65 are provided with the same structure as shown in FIG. 10.

As mentioned above, in the antenna apparatus 60 in accordance with the example 5, the coaxial cable Ca for the non-earthed type antenna A and the coaxial cable Cb for the earthed type antenna B which are provided in conjunction with each other are not cramped by being bundled as shown in FIG. 10, but are fastened to the antenna substrate 61 in a state in which they are sufficiently apart from each other.

That is, the electric current is fed to both the non-earthed type antenna and the earthed type antenna B by the independent feed lines La and Lb for the respective coaxial cables Ca and Cb for the antennas, so that it is possible to securely remove the influence applied to each other.

Next a description will be in detail given below of an second embodiment in accordance with the present invention.

Figure 14:
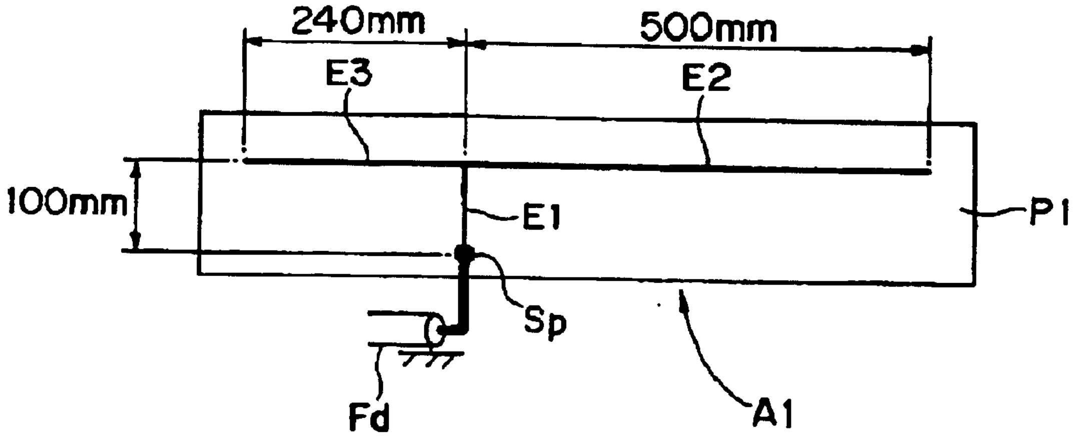
FIG. 14 is an explanatory view schematically showing one example of an antenna pattern of a T-type antenna in accordance with a second embodiment of the present invention.

At first, a description will be given of an antenna pattern of an antenna apparatus in accordance with the second embodiment of the present invention. FIG. 14 is an explanatory view schematically showing one example of the antenna pattern of the antenna apparatus for the vehicle in accordance with the present embodiment.

As shown in this drawing, in an antenna apparatus A1 in accordance with the present embodiment, an antenna pattern having an approximately T-shaped as a whole is formed on an antenna substrate P1. Antenna elements of the antenna pattern are constituted by a first antenna element E1 which extends in a direction moving apart from a vehicle body (to an upper side in FIG. 14), and a second antenna element E2 and a third antenna element E3 which are branched from a leading end of the first antenna element E1 and extend in substantially reverse directions to each other in a direction crossing to the first antenna element E1 (in a right and left direction in FIG. 14), and are formed in an approximately T-shaped as a whole. A feeder line Fd is connected to a base end side of the first antenna element E1 via a feeding point Sp.

In this structure, a high frequency band (for example, a frequency band of TV broadcast wave) is received by the first antenna element E1 and the third antenna element E3, a next high frequency band (for example, a frequency band of FM broadcast wave) is received by the first antenna element E1 and the second antenna element E2, and a low frequency band (for example, a frequency band of AM broadcast wave) is received by a whole of the first to third antenna elements E1 to E3.

In the example shown in FIG. 14, a length of the first antenna element E1 is set, for example, to 100 mm, a length of the second antenna element E2 is set, for example, to 500 mm, and a length of the third antenna element E3 is set, for example, to 240 mm, respectively, and an entire length of the antenna is 840 mm.

Then, it is set such that the TV broadcast wave is received by an antenna portion (the summation of the length of the first antenna element E1 and the third antenna element E3) having a length of 340 mm, the FM broadcast wave is received by an antenna portion (the summation of the length of the first antenna element E1 and the second antenna element E2) having a length of 600 mm, and the AM broadcast wave is received by an antenna portion (the summation of the length of the first antenna element E1, the second antenna element E2 and the third antenna element E3) having a length of 840 mm.

As mentioned above, since the antenna pattern formed in the approximately T-shaped as a whole is structured by the first antenna element E1, and the second antenna element E2 and the third antenna element E3 which are branched from the leading end of the first antenna element E1 and extend in the substantially reverse directions to each other in the crossing direction, antenna functions corresponding to a plurality of antennas having different lengths can be achieved by the antenna portion obtained by combining the first and second antenna elements E1 and E2, the antenna portion obtained by combining the first and third antenna elements E1 and E3, and the antenna portion obtained by combining all the first to third antenna elements E1 to E3, so that it is possible to correspond to receipt of a plurality of radio waves having different frequencies by one antenna pattern.

That is, even in the case that an installation space of an antenna A1 is limited, it is possible to achieve all of the receiving sensitivities with respect to a plurality of receivable frequencies by suitably setting the lengths of the respective first to third antenna elements E1 to E3. In this case, since the structure can be obtained without adding the other parts such as a special coil or the like than the antenna elements, neither the antenna structure is particularly made complex, nor the manufacturing cost is particularly increased.

Figure 15:
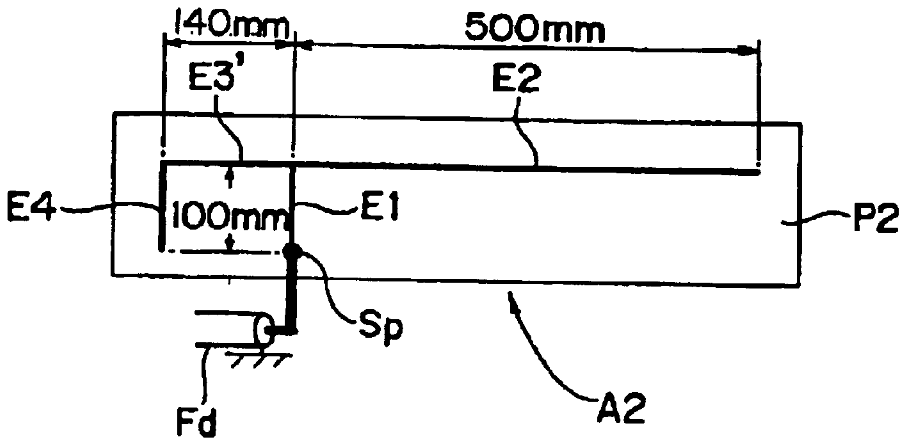
FIG. 15 is an explanatory view schematically showing one example of an antenna pattern of an F-type antenna in accordance with a modified example of the second embodiment.

FIG. 15 is an explanatory view schematically showing one example of an antenna pattern of an antenna apparatus A2 for a vehicle in accordance with a modified example of the second embodiment of the present invention. In this case, in the following description, the same reference numerals are attached to elements substantially the same as those in the example shown in FIG. 14, and a further description thereof will be omitted.

In this modified example, antenna elements arranged on a substrate P2 are provided with a fourth antenna element E4 which is folded back from a terminal portion of a third antenna element in an approximately perpendicular direction (that is, in parallel to the first antenna element E1), and form an approximately F-shaped antenna pattern as a whole.

Then, the structure is made such that the high frequency band (for example, the frequency band of TV broadcast wave) is received by the first antenna element E1, the third and fourth antenna elements E3' and E4, the next high frequency band (for example, the frequency band of FM broadcast wave) is received by the first antenna element E1 and the second antenna element E2, and the low frequency band (for example, the frequency band of AM broadcast wave) is received by a whole of the first to fourth antenna elements E1 to E4.

In the example shown in FIG. 15, a length of the first antenna element E1 is set, for example, to 100 mm in the same manner as the case in FIG. 14, a length of the second antenna element E2 is also set, for example, to 500 mm in the same manner as the case in FIG. 14, a length of the third antenna element E3' is set shorter than the case in FIG. 14, for example, to 140 mm, and a length of the fourth antenna element E4 is set equal to that of the first antenna element E1, that is, to 100 mm, respectively, and an entire length of the antenna is 840 mm equal to the case in FIG. 14.

Then, it is set such that the TV broadcast wave is received by an antenna portion (the summation of the length of the first antenna element E1, the third antenna element E3' and the fourth antenna element E4) having a length of 340 mm, the FM broadcast wave is received by an antenna portion (the summation of the length of the first antenna element E1 and the second antenna element E2) having a length of 600 mm, and the AM broadcast wave is received by an antenna portion (the whole length of the summation of the first to fourth antenna elements E1 to E4) having a length of 840 mm.

In the case of the antenna A2 in accordance with the modified embodiment, in particular, the antenna is provided with the fourth antenna element E4 which is folded back from the terminal portion of the third antenna element E3' in the substantially perpendicular direction, and an antenna pattern having an approximately F shape as a whole is structured.

Accordingly, as is well known by being compared with the antenna apparatus A1 in FIG. 14, the length of the second and third antenna elements E2 and E3' in an extending direction (a right and left direction in FIG. 15) which generally tends to be longest is made short.

Figure 12:
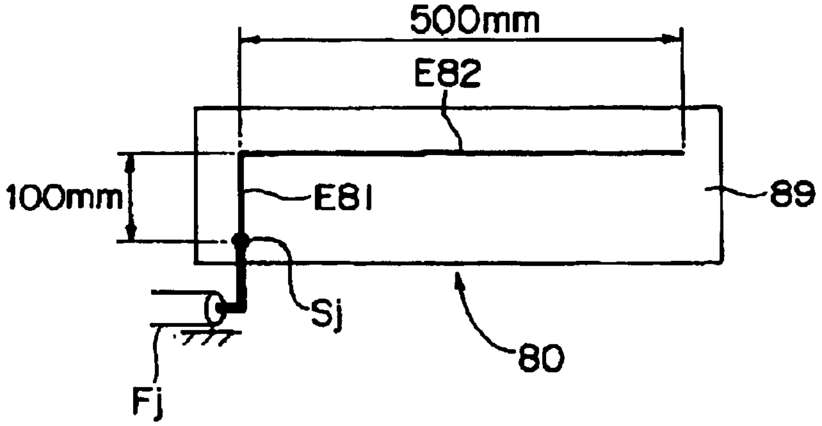
FIG. 12 is an explanatory view schematically showing one example of an antenna pattern of an L-type antenna.

That is, with regard to the L-type antenna 80 shown in FIG. 12, even in the case that the entire length of the antenna is set long for the purpose of improving the receiving sensitivity for the AM broadcast wave, it is possible to extend the length of the antenna without increasing the length in the right and left direction, so that it is possible to obtain an antenna apparatus which is more advantageous in view of intending to save space.

Figure 13:
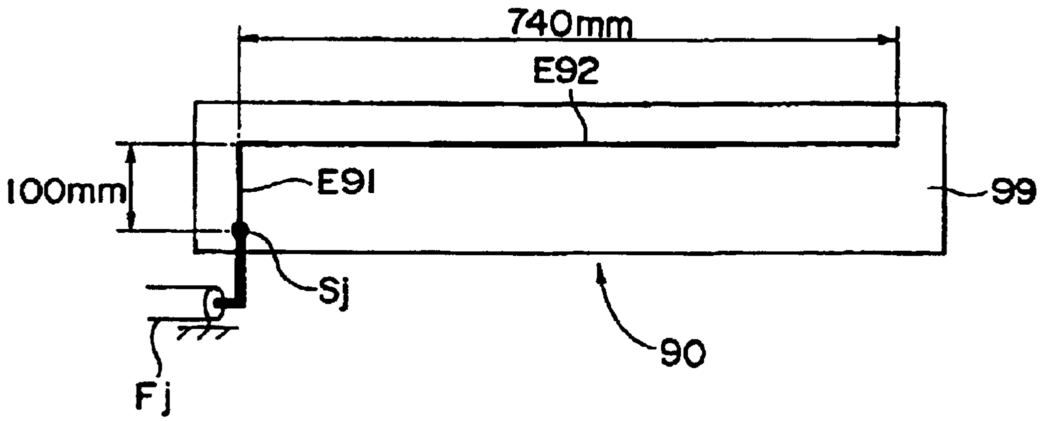
FIG. 13 is an explanatory view schematically showing an antenna pattern of an L-type extended antenna obtained by extending the L-type antenna.

In order to make sure of an effect of improving the receiving property in the antenna apparatuses A1 and A2 in accordance with the embodiments of the present invention mentioned above, a comparative test is carried out so as to be compare with the L-type antenna shown in FIG. 12 and the L-type extended antenna shown in FIG. 13 as comparative examples. The F-type antenna A2 shown in FIG. 15 is employed as the example in accordance with the present invention.

The test is carried out in a low frequency band between 603 and 1404 kHz (subject to be received: AM radio broadcast wave), and high frequency bands between 76 and 90 MHz (subject to be received: FM radio broadcast wave) and between 170 and 225 MHz (subject to be received. VHF/High band). Results of the respective tests are shown in Table 1, and FIGS. 16 and 17.

TABLE 1

| | Frequency (kHz) | | |
|---|---|---|---|
| | 603 | 999 | 1404 |
| L-type antenna | | Reference | |
| L-type extension | +3 | +3 | +4 |
| F-type antenna | +2 | +2.5 | +3 |

Unit: dB

As is known from the results of test in Table 1, with regard to the frequency band (the low frequency band) of the AM radio broadcast wave, in the case of the F-type antenna in accordance with the embodiment of the present invention, the receiving sensitivity is 2 to 3 dB improved in comparison with the L-type antenna (the reference). Further, a degree of improvement bears comparison with the case of the larger-sized (long to a longitudinal direction) L-type extended antenna.

Figure 16:
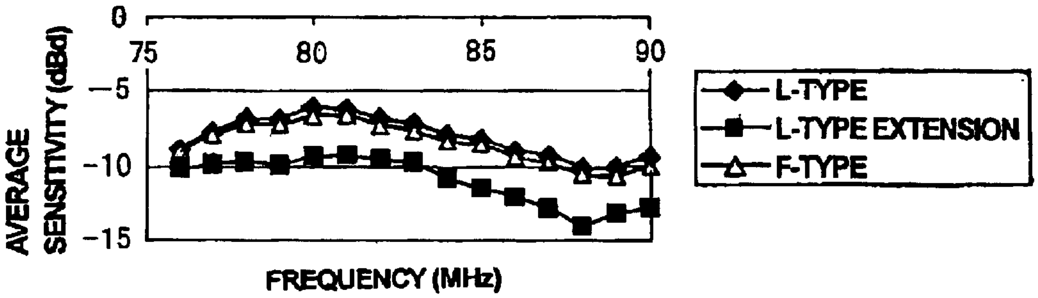
FIG. 16 is one of graphs showing results of comparative test in a receivable sensitivity of the F-type antenna.

Further, as is known from a graph in FIG. 16, with regard to the frequency band of the FM radio broadcast wave, in the case of the F-type antenna A2 in accordance with the embodiment of the present invention, almost the same receiving sensitivity as that of the L-type antenna 80 can be obtained. On the contrary, in the case of the L-type extended antenna 90, the receiving sensitivity is significantly lowered.

Figure 17:
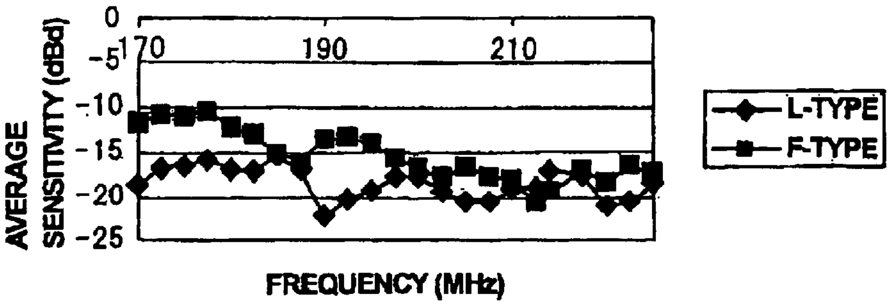
FIG. 17 is one of graphs showing results of comparative test in a receivable sensitivity of the F-type antenna.

Further, as is known from a graph in FIG. 17, with regard to the frequency band of the VHF/High, the higher receiving sensitivity than that of the L-type antenna 80 can be obtained by employing the F-type antenna A2.

As mentioned above, it can be confirmed that a satisfactory receiving sensitivity can be obtained in both of the low frequency band and the high frequency band in comparison with the L-type or L-type extended antenna while achieving a space saving, by using the antenna in accordance with the present invention exemplified by the F-type antenna pattern.

Next, a description will be given of a method of obtaining an antenna pattern excellent in receiving property of both the frequency bands in a very efficient manner and capable of easily designing an antenna which can receive two radio waves having different frequencies, by using the antenna (refer to FIG. 14) having the substantially T-shaped pattern as mentioned above, structuring the antenna portion corresponding to the low frequency band by the first antenna element and the second antenna element, and structuring the antenna portion corresponding to the high frequency band by the first antenna element and the third antenna element.

Figure 18:
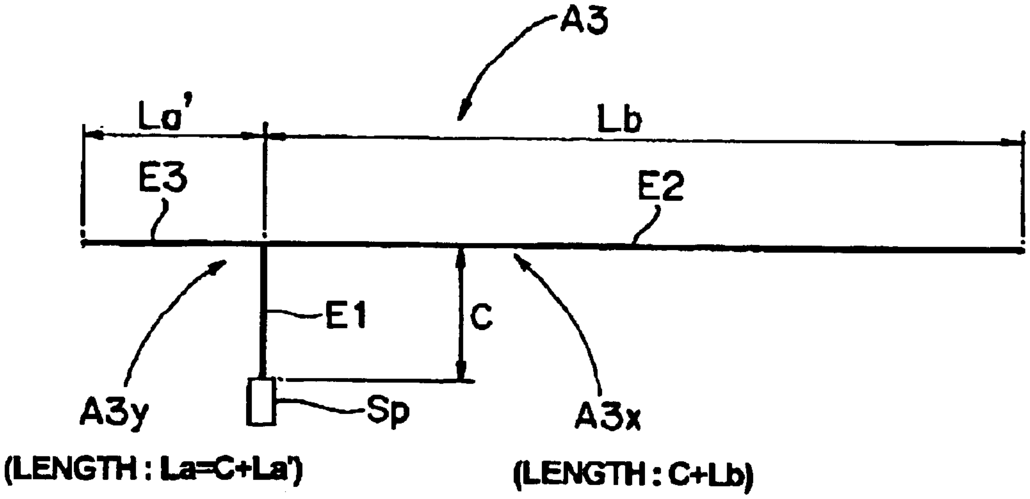
FIG. 18 is a schematically explanatory view used for explaining a pattern setting method of the T-type antenna in accordance with the second embodiment of the present invention.

FIG. 18 is an explanatory view of a T-type antenna A3 used for describing a method of setting such an antenna pattern. In the same manner as the case in FIG. 14, the antenna elements are formed in an approximately T-shaped as a whole by a first antenna element E1 (length: C) extending in a direction moving apart from the vehicle body, and a second antenna element E2 (length: Lb) and a third antenna element E3 (length: La) which are branched from a leading end of the first antenna element E1 and extend in substantially reverse direction to each other in a direction crossing to the first antenna element E1.

In the case of the antenna A3 in FIG. 18, it is set such that a first antenna portion A3*x* (an antenna for a low frequency: antenna length=C+Lb) corresponding to the low frequency band is structured by the first antenna element E1 and the second antenna element E2, and a second antenna portion A3*y* (an antenna for a high frequency: antenna length La=C+La') corresponding to the high frequency band is structured by the first antenna element E1 and the third antenna element E3.

In this case, in this embodiment, the antenna A3 mentioned above is set, for example, for receiving the VHF, and is set for receiving the low frequency band of the VHF (VHF/Low) and the high frequency band of the VHF (VHF/High).

First, it is considered to set the length C of the first antenna element E1. In order to determine a preferable range of the length C of the first antenna element E1, a voltage standing wave ratio (VSWR) of a resonance frequency by the second antenna element E2 of the antenna A3*x* for the low frequency is measured by fixing the length La of the third antenna element E3 to 0, that is, setting the antenna A3*x* to the L-type antenna, fixing a resonance point of the antenna A3*x* for the low frequency to a constant value, and sequentially changing the length C of the first antenna element E1, for example, to 0 to 100 mm (0, 10, 30, 50, 70, 90 and 100 mm). Further, in conjunction therewith, the change in the length Lb of the second antenna element E2 is recorded. Further, such a series of measurements are carried out with regard to the case that the resonance point of the antenna A3*x* for the low frequency is fixed to various values (for example, to 90, 100 and 110 MHz).

As is well known, it is preferable that the VSWR is smaller, and in the case of the antenna apparatus for the vehicle, it is generally required that this VSWR is restricted to be less than 3. Accordingly, in the measurement of the VSWR at the resonance frequency mentioned above, it is set such as to determine the range of the length C of the first antenna element E1 capable of maintaining the relation VSWR<3. In this case, the method and apparatus for measuring the VSWR are the same as the conventionally known ones.

In accordance with the result of measurement of the VSWR mentioned above, it is known that there is a case that the relation VSWR>3 may be established in the range C<50 mm. Specifically, in the case that the resonance point of the antenna A3*x* for the low frequency is 90 MHz, it is possible to maintain the relation VSWR<3 in the range C≧50 mm, however, the relation VSWR>3 is established in the other cases than the case C=30 mm, in the range C<40 mm.

Accordingly, it is necessary to set the length C of the first antenna element E1 equal to or more than 50 mm (C≧50 mm).

Figure 19:
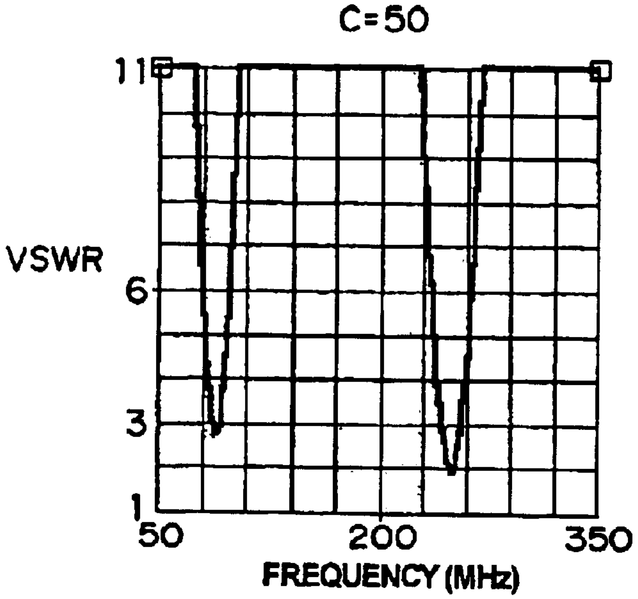
FIG. 19 is a graph showing one example of VSWR measurement data with respect to an antenna for a low frequency of the T-type antenna.
Figure 20:
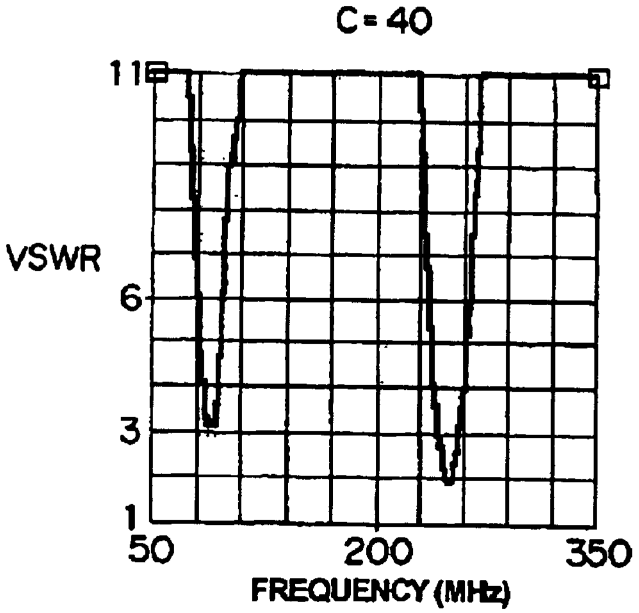
FIG. 20 is a graph showing one example of VSWR measurement data with respect to an antenna for a low frequency of the T-type antenna.

In this case, with regard to the case that the resonance point of the antenna A3*x* for the low frequency is 90 MHz, examples of data of the VSWR measurement in C=50 mm and C=40 mm will be shown in FIGS. 19 and 20. As is known by comparing both the drawings, in the case of C=50 mm, the relation VSWR<3 is maintained in both of the first resonance frequency (90 MHz) and the second resonance frequency, however, in the case of C=40 mm, the VSWR in the first resonance frequency is more than 3.

Next, a consideration is given of a relation in the length between the antenna A3*y* for the high frequency and the antenna A3*x* for the low frequency. At a time of considering this, a ratio La/Lb of the length La (=C+La') of the antenna A3*y* for the high frequency with respect to the length Lb of the second antenna element E2 of the antenna A3*x* for the low frequency is checked.

In order to determine a preferable range of this ratio (La/Lb), the VSWR of the resonance frequency by the antenna A3*y* for the high frequency is measured by fixing the resonance point of the antenna A3*x* for the low frequency to a constant value, sequentially changing the length C of the first antenna element E1, for example, to 0 to 100 mm (0, 10, 30, 50, 70, 90 and 100 mm), and changing the ratio (La/Lb) between 0 and 1.00 per 0.05. Further, such a series of measurements are carried out with regard to the case that the resonance point of the antenna A3*x* for the low frequency is fixed to various values (for example, to 90 and 100 MHz).

In accordance with the result of measurement of the VSWR, it is known that there is a case that the relation VSWR>3 may be established in the range the ratio La/Lb>0.8, even in the relation C≧50 is established. Specifically, as exemplified by Table 2, in the case that the resonance point of the antenna A3*x* fox the low frequency is 90 MHz, the VSWR<3 of the second resonance frequency by the antenna for the high frequency is more than 3 in the ratio La/Lb≧0.85 even when the relation C=90 mm is established.

Accordingly, it is necessary to set the ratio (La/Lb) equal to or less than 0.80 (La/Lb≦0.80).

TABLE 2

VSWR of second resonance frequency

| Ratio | C = 100 | C = 90 | C = 70 | C = 50 | C = 30 | C = 10 | C = 0 |
|---|---|---|---|---|---|---|---|
| 1.00 | | | | | | | |
| 0.95 | 6.2 | 4.8 | 3.8 | 2.5 | 1.8 | 1.5 | 1.5 |
| 0.90 | 4.6 | 3.7 | 2.6 | 2.0 | 1.2 | 1.0 | 1.0 |
| 0.85 | 2.8 | 3.2 | 2.5 | 1.3 | 1.0 | 1.3 | 1.3 |
| 0.80 | 2.2 | 2.0 | 1.9 | 1.6 | 1.0 | 1.2 | 1.2 |
| 0.75 | 1.5 | 1.4 | 1.3 | 1.1 | 1.1 | 1.3 | 1.2 |
| 0.70 | 1.3 | 1.2 | 1.1 | 1.3 | 1.8 | 1.7 | 1.7 |
| 0.65 | 1.2 | 1.1 | 1.1 | 1.4 | 1.8 | 2.0 | 2.0 |
| 0.60 | 1.3 | 1.0 | 1.3 | 1.6 | 2.1 | 2.9 | 2.9 |
| 0.55 | 1.3 | 1.2 | 1.2 | 1.6 | 2.0 | 2.3 | 2.3 |
| 0.50 | 1.7 | 1.5 | 1.2 | 1.3 | 1.3 | 1.9 | 1.9 |
| 0.45 | 2.0 | 1.8 | 1.2 | 1.0 | 1.2 | 1.4 | 1.4 |
| 0.40 | 2.0 | 1.8 | 1.5 | 1.2 | 1.0 | 1.4 | 1.4 |
| 0.35 | 2.1 | 2.0 | 1.8 | 1.4 | 1.4 | 1.2 | 1.1 |
| 0.30 | 2.2 | 2.0 | 1.9 | 1.7 | 1.4 | 1.2 | 1.2 |
| 0.25 | 2.7 | 2.5 | 2.1 | 1.9 | 1.4 | 1.2 | 1.2 |
| 0.20 | 2.5 | 2.4 | 2.0 | 1.8 | 1.5 | 1.3 | 1.2 |
| 0.15 | 2.5 | 2.4 | 2.1 | 1.8 | 1.5 | 1.2 | 1.2 |
| 0.10 | 2.0 | 2.0 | 1.8 | 1.7 | 1.4 | 1.2 | 1.1 |
| 0.05 | 1.9 | 1.9 | 1.8 | 1.6 | 1.5 | 1.2 | 1.2 |
| 0.00 | 2.0 | 1.9 | 1.8 | 1.8 | 1.5 | 1.3 | 1.3 |

Further, at a time of measuring the VSWR in connection to the ratio La/Lb, the resonance frequency of the antenna A3*y* for the high frequency is measured in each of the ratios. An example of measured data of the resonance frequency of the antenna A3*y* for the high frequency by each of the ratios with respect to the case that the resonance point of the antenna A3*x* for the low frequency is fixed, for example, to 90 and 100 MHx will be shown in each of Tables 3 and 4.

TABLE 3

Relation between ratio of La and Lb and second resonance frequency (first resonance frequency is 90 MHz)
La:Lb = 1 to 0:1

| Ratio | C = 100 | C = 90 | C = 70 | C = 50 | C = 30 | C = 10 | C = 0 |
|---|---|---|---|---|---|---|---|
| 1.00 | 85 | 89 | | | 99 | 98 | 99 |
| 0.95 | 114 | 110 | 108 | 105 | 102 | 101 | 100 |
| 0.90 | 117 | 113 | 110 | 108 | 105 | 104 | 103 |
| 0.85 | 122 | 119 | 114 | 111 | 109 | 108 | 108 |
| 0.80 | 126 | 123 | 121 | 117 | 114 | 113 | 114 |
| 0.75 | 130 | 128 | 125 | 123 | 121 | 120 | 121 |
| 0.70 | 135 | 132 | 130 | 128 | 127 | 125 | 127 |
| 0.65 | 141 | 139 | 136 | 134 | 133 | 134 | 135 |
| 0.60 | 148 | 145 | 143 | 141 | 140 | 142 | 143 |
| 0.55 | 155 | 152 | 151 | 150 | 149 | 151 | 154 |
| 0.50 | 162 | 160 | 159 | 159 | 159 | 161 | 164 |
| 0.45 | 172 | 169 | 169 | 168 | 169 | 173 | 176 |
| 0.40 | 184 | 181 | 179 | 180 | 182 | 186 | 191 |
| 0.35 | 196 | 190 | 191 | 192 | 195 | 202 | 207 |
| 0.30 | 206 | 205 | 205 | 206 | 211 | 218 | 222 |
| 0.25 | 219 | 217 | 222 | 219 | 226 | 232 | 235 |
| 0.20 | 232 | 233 | 232 | 236 | 236 | 242 | 244 |
| 0.15 | 248 | 243 | 241 | 243 | 245 | 249 | 249 |
| 0.10 | 253 | 252 | 252 | 251 | 250 | 253 | 252 |
| 0.05 | 259 | 257 | 256 | 254 | 253 | 255 | 255 |
| 0.00 | 262 | 260 | 259 | 257 | 254 | 257 | 255 |

TABLE 4

Relation between ratio of La and Lb and second resonance frequency (first resonance frequency is 100 MHz)
La:Lb = 1 to 0:1

| Ratio | C = 100 | C = 90 | C = 70 | C = 50 | C = 30 | C = 10 | C = 0 |
|---|---|---|---|---|---|---|---|
| 1.00 | | 89 | | | | 108 | |
| 0.95 | | 123 | | | 110 | 108 | 108 |
| 0.90 | 126 | 127 | 124 | 120 | 113 | 111 | 111 |
| 0.85 | 134 | 131 | 128 | 124 | 118 | 116 | 116 |
| 0.80 | 138 | 135 | 132 | 130 | 123 | 122 | 123 |
| 0.75 | 143 | 140 | 137 | 135 | 129 | 129 | 130 |
| 0.70 | 147 | 145 | 143 | 141 | 136 | 135 | 137 |
| 0.65 | 153 | 152 | 150 | 148 | 142 | 143 | 145 |
| 0.60 | 159 | 159 | 157 | 156 | 150 | 152 | 154 |
| 0.55 | 166 | 167 | 165 | 164 | 160 | 161 | 163 |
| 0.50 | 174 | 175 | 175 | 175 | 169 | 172 | 176 |
| 0.45 | 186 | 186 | 186 | 186 | 181 | 185 | 190 |
| 0.40 | 196 | 197 | 198 | 199 | 200 | 199 | 205 |
| 0.35 | 201 | 210 | 212 | 215 | 210 | 216 | 221 |
| 0.30 | 224 | 230 | 232 | 232 | 226 | 231 | 237 |
| 0.25 | 236 | 237 | 241 | 245 | 238 | 247 | 250 |
| 0.20 | 251 | 250 | 255 | 256 | 253 | 257 | 259 |
| 0.15 | 259 | 258 | 261 | 263 | 260 | 264 | 265 |
| 0.10 | 267 | 265 | 268 | 268 | 266 | 269 | 269 |
| 0.05 | 275 | 271 | 274 | 274 | 270 | 273 | 272 |
| 0.00 | 281 | 280 | 279 | 278 | 274 | 275 | 272 |

As is known from Tables 3 and 4, if the ratio La/Lb is determined, the resonance frequency of the antenna A3*y* for the high frequency is fit within a very narrow range without relation to the value of the length C (≧50 mm) of the first antenna element E1. This is applied in the same manner if the resonance point of the antenna A3*x* for the low frequency is different.

Further, for example, a description will be given of an example of the case that the resonance point of the antenna A3*x* for the low frequency is 90 MHz and the ratio establishes the relation La/Lb=0.40. The resonance frequency of the antenna A3*y* for the high frequency exists in a range between 179 and 184 MHz with respect to the range C≧50 mm, and an average value is 181 MHz. This is 2.01 times the resonance point of the antenna A3*x* for the low frequency. Further, a description will be given of an example of the case that the resonance point of the antenna A3*x* for the low frequency is 100 MHz and the ratio establishes the relation La/Lb=0.40. The resonance frequency of the antenna A3*y* for the high frequency exists in a range between 196 and 199 MHz with respect to the range C≧50 mm, and an average value is 197.5 MHz. This is 1.975 times the resonance point of the second antenna element.

That is, in the case of the ratio La/Lb=0.40, the resonance frequency of the antenna A3*y* for the high frequency is, regardless of the resonance frequency of the antenna A3*x* for the low frequency, about 2.0 times the resonance point of the antenna A3*x* for the low frequency at least with respect to the range C≧50 mm.

As mentioned above, when the ratio La/Lb is defined, the magnification (multiple) of the resonance frequency of the antenna A3*y* for the high frequency with respect to the resonance point of the antenna A3*x* for the low frequency becomes approximately fixed even if the length C (≧50 mm) of the first antenna element E1 or the resonance point of the antenna A3*x* for the low frequency is different. And, this is applied in the same manner as mentioned above in the other ratios La/Lb.

In other words, when the magnification (multiple) of the resonance frequency of the antenna A3*y* for the high frequency with respect to the resonance frequency of the antenna A3*x* for the low frequency is set, the ratio La/Lb mentioned above is defined. Accordingly, by setting any one of the length Lb of the second antenna element E2 and the length La of the antenna A3*y* for the high frequency and setting the multiple of the resonance frequency of the antenna A3*y* for the high frequency with respect to the resonance frequency of the antenna A3*x* for the low frequency, another length La or Lb is defined on the basis of the ratio La/Lb mentioned above.

Accordingly, Table 5 (multiple range is, for example, between 1.5 and 2.5) showing a correlation between a multiple X of the resonance frequency of the antenna A3*y* for the high frequency with respect to the resonance frequency of the antenna A3*x* for the low frequency, and the ratio La/Lb (coefficient K) of the length La of the antenna A3*y* for the high frequency with respect to the length Lb of the second antenna element E2 is prepared on the basis of the data mentioned above (for example, refer to Tables 3 and 4). The antenna pattern can be designed on the basis of this Table 5. In accordance with Table 5, the larger the multiple X is, the smaller the coefficient K is.

TABLE 5

| Multiple X | Coefficient K |
|---|---|
| 1.5 | 0.65 |
| 1.6 | 0.60 |
| 1.7 | 0.55 |
| 1.8 | 0.50 |
| 1.9 | 0.45 |
| 2 | 0.40 |
| 2.1 | 0.35 |
| 2.2 | 0.33 |
| 2.3 | 0.30 |
| 2.4 | 0.25 |
| 2.5 | 0.20 |

Next, a description will be given of setting the length of each of the antenna elements E1, E2 and E3 using this Table 5, for example, on the basis of an example of the case the antenna elements are applied to a VHF (High and Low) antenna.

(1) First, for example, a (center) frequency to be resonated in the low frequency band (VHF/Low) is set, and the length Lb of the second antenna element E2 is computed.

(2) The antenna pattern is set to the T-type, and the length C to the branch point (the length of the first antenna element E1) is set to the range C≧50 mm due to the reason mentioned above. Since the material of the antenna substrate is dielectric substance, the length Lb of the second antenna element E2 determined in the item (1) mentioned above is substantially shortened due to a dielectric constant ∈, so that it is necessary to carry out a fine adjustment. It is to be noted that, at this time, it is necessary that the length of the third antenna element E3 is set to 10 mm or more.

(3) Next, a (center) frequency to be resonated in the high frequency band (VHF/High) is set.

(4) Computation is carried out so as to determine what times the resonance frequency in the high frequency band is with respect to the resonance frequency in the low frequency band.

(5) The coefficient K corresponding to the multiple X is determined on the basis of Table 5 mentioned above, and is multiplied the length Lb of the second antenna element E2 determined in the item (2) mentioned above. Accordingly, the length La of the antenna A3*y* for the high frequency is determined, and thus the length La' of the third antenna element E3 is determined. That is, the antenna A3 in correspondence to the desired frequency set in the items (1) and (3) can be obtained.

A description will be given of a method of setting the antenna pattern mentioned above on the basis of a particular embodiment.

(1) The resonance frequency (the first resonance frequency) in the low frequency band (VHF/Low) is set, for example, to 100 MHz, and the length Lb of the second antenna element E2 is computed.

$$Lb+C=\lambda/4=750\text{ mm}$$

In this case, λ is a wavelength corresponding to the frequency 100 MHz, and λ/4 gives an ideal antenna length of the antenna receiving the radio wave having this wavelength.

(2) The length C of the first antenna element E1 is set, for example, to 90 mm. Therefore, the length Lb of the second antenna element E2 becomes 660 mm, however, a fine adjustment is carried out so that the resonance frequency is 100 MHz due to a dielectric constant ∈ of the material of the antenna substrate. As a result of this fine adjustment, the relation Lb=530 mm is established.

(3) The resonance frequency (the second resonance frequency) in the high frequency band (VHF/High) is set, for example, to 200 MHz.

(4) The multiply X is computed. X=200/100=2

(5) The coefficient K corresponding to the multiple X (=2) is determined on the basis of Table 5 mentioned above (K=0.4), and this coefficient K is multiplied the length Lb (=530 mm) of the second antenna element E2 determined in the item (2). Accordingly, the length La of the antenna A3*y* for the high frequency is determined. Then, the length La' of the third antenna element E3 is determined.

$$La=530\times0.4=212\text{ mm}$$

$$La'=212-90=122\text{ mm}$$

In the manner mentioned above, as the VHF antenna A3 in which the resonance frequency in the low frequency band (VHF/Low) is 100 MHz and the resonance frequency in the high frequency band (VHF/High) is 200 MHz, there can be obtained the antenna A3 in which the length C of the first antenna element E1 is 90 mm, the length Lb of the second antenna element E2 is 530 mm, and the length La' of the third antenna element E3 is 122 mm.

Owing to the antenna apparatus manufactured on the basis of the method of setting the antenna pattern in accordance with the present embodiment, since the antenna pattern formed in the approximately T-shaped as a whole is constituted by the first to third antenna elements E1 to E3, it is possible to achieve all of the respective receiving sensitivities in a plurality of receiving frequencies with a limited installation space and without particularly making the antenna structure complex and increasing the manufacturing cost.

Further, at a time of constructing the antenna portion A3*x* corresponding to the low frequency band by the first antenna element E1 and the second antenna element E2, and constructing the antenna portion A3*y* corresponding to the high frequency band by the first antenna element E1 and the third antenna element E3, since the length of the third antenna element E3 is set on the basis of the value obtained by multiplying the length of the second antenna element E2 by the predetermined coefficient, it is possible to easily design the antenna, and it is possible to obtain the antenna pattern which is excellent in the receiving property in both the frequency bands very efficiently.

In particular, it is possible to very efficiently obtain the antenna pattern which is excellent in the receiving property of both the frequency bands, by using the coefficient K which is changed in correspondence to the magnification X of the frequency in the high frequency band with respect to the frequency in the low frequency band, and becomes smaller in accordance with the increase of the magnification X.

In this case, it goes without saying that the method of setting the antenna pattern as mentioned above can be applied not only to the VHF antenna provided with the antenna functions for receiving both the low frequency band and the high frequency band, but also to the other various antennas receiving a plurality of radio waves having different frequencies.

Next, a description will be given of a particular example at a time of mounting the antenna apparatus in accordance with the second embodiment of the present invention to the vehicle.

Figure 21:
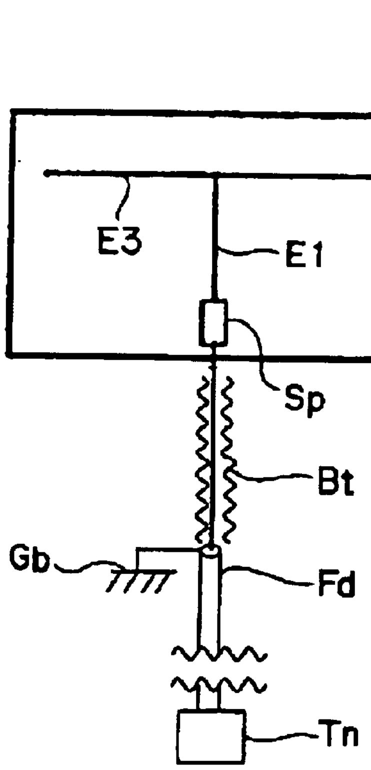
FIG. 21 is an explanatory view schematically showing a T-type pattern antenna apparatus in accordance with the second embodiment of the present invention.

FIG. 21 is a schematic explanatory view of the antenna, for example, formed in the T-type in accordance with the second embodiment of the present invention. As shown in this drawing, the antenna apparatus A mentioned above is provided with the antenna pattern formed in the T-shaped by the first, second and third antenna elements E1, E2 and E3, in the same manner as that shown in FIGS. 14 and 18, and structured by arranging the antenna pattern on the thin antenna substrate P.

As mentioned above, since the antenna elements E1 to E3 are arranged on the thin antenna substrate P, and are mounted to the vehicle body member via the antenna substrate P, it is possible to easily and securely mount the antenna A in comparison with the case that the antenna elements are directly mounted to the vehicle body member.

The coaxial cable Fd (feeder) for feeding the electric current which is extended from the tuner Tn is connected to the first antenna element E1 of the antenna A via the feeding point Sp. This coaxial cable Fd is the same as the conventionally known one, although the structure thereof is not particularly illustrated. The coaxial cable Fd is provided with an inner conductor and an outer conductor, and near the feeding point Sp, the inner conductor is covered with a bellows-like boot Bt, for example, formed by a rubber or a soft resin. The outer conductor is earthed by the earthed portion Gb.

In the case of mounting the antenna apparatus in accordance with the second embodiment of the present invention to the vehicle, the same mounting structure as those of the first embodiment of the present invention (refer to FIGS. 1 to 8) can be applied effectively with the same advantage respectively.

That is, in the case that the antenna apparatus is mounted to the vehicle by utilizing an opening and closing body for opening and closing an opening of the vehicle body such as an rear gate (refer to FIGS. 1 and 2), by arranging the antenna elements E1 to E3 and the feeding points Sp in the inner side of the outer panel made of the electrically non-conductive material (the synthetic resin material), it is possible to prevent the antenna apparatus A from being visible from the outer portion of the vehicle M1 without damaging the receiving performance, and it is possible to improve an outer appearance of the vehicle.

Further, in the case that the antenna apparatus is mounted to the vehicle by utilizing an air spoiler (refer to FIGS. 3 and 4), by arranging the antenna elements E1 to E3 and the feeding points Sp in the inner space of the air spoiler made of the electrically non-conductive material (the synthetic resin material), it is possible to achieve basically the same operations and effects as those in the case of the rear gate mentioned above with regard to the antenna property, the appearance property in the vehicle and the like. In this case, it is determined in correspondence to with or without the air spoiler, that is, in correspondence to a vehicle type or a specification whether or not the antenna apparatus A is provided. Therefore, it can be known on the basis of only the outer appearance of the vehicle whether or not the antenna apparatus A is to be mounted, particularly at a time of assembling the vehicle on a mixed flow line in which various types of vehicles are assembled, so that it is not necessary to take a lot of trouble such as judging by referring to an assembly specification or the like, and there is no risk that an erroneous assembly is carried out.

Still further, in the case that the antenna apparatus is mounted to the vehicle by utilizing a bumper (refer to FIGS. 5 and 6), by arranging the antenna elements E1 to E3 and the feeding points Sp in the inner side of the bumper face made of the electrically non-conductive material (the synthetic resin material), it is possible to prevent the antenna apparatus A from being visible from the outer portion of the vehicle by utilizing the synthetic resin parts which are later attached to the vehicle body without deteriorating the receiving performance, thereby contributing to an improvement of the outer appearance in the vehicle.

Still further, in the case that the antenna apparatus is mounted to the vehicle by utilizing a window such as a rear window (refer to FIGS. 7 and 8), by arranging the antenna on a rear window glass corresponding to an electrically non-conductive member covering a window portion in the rear portion of the vehicle body, it is possible to achieve basically the same operations and effects as those in the case of the rear gate mentioned above with regard to the antenna property, the appearance property in the vehicle and the like. In particular, in this case, it is possible to place the antenna which is excellent in the receiving performance by utilizing the window portion having the comparatively wide receivable range.

It should be noted that the present invention is not limited to the embodiments mentioned above, and it goes without saying that various improvements and various modifications in design can be employed within the scope of the present invention.

What is claimed is:

1. An antenna apparatus for a vehicle, said antenna apparatus being provided on the vehicle in which at least a part of constituent members of the vehicle is made of an electrically non-conductive material, and an earthed conductor on a part of a vehicle body is included, wherein the antenna apparatus has at least one non-earthed type antenna, wherein said non-earthed type antenna is provided with a first element connected to an inner conductor of a first coaxial line via a first connection point, and a second element connected to an outer conductor of said first coaxial line via a second connection point, wherein the antenna apparatus further has at least one earthed type antenna, wherein said earthed type antenna is provided with a third element connected to an inner conductor of a second coaxial line via a third connection point, and an outer conductor of said second coaxial line is earthed at an earthed portion on the earthed conductor, wherein at least said first, second and third elements and said first, second and third connection points are arranged in a portion which is inside the constituent member made of said electrically non-conductive material and is apart from the earthed conductor, and wherein at least a part of the first coaxial line and the second coaxial line are provided close to each other, and the second coaxial line is structured such that the inner conductor is covered with the outer conductor at least a part of a range from earthed portion to the third connection point.

2. The antenna apparatus for a vehicle as claimed in claim 1, wherein a leader portion of the coaxial line for said non-earthed type antenna to said first and second connection points is drawn out in a different direction from respective extending directions of said first and second elements.

3. The antenna apparatus for a vehicle as claimed in claim 1, wherein said earthed type antenna is set so as to cover a lower frequency band than a receivable frequency band of said non-earthed type antenna.

4. The antenna apparatus for a vehicle as claimed in claim 1, wherein respective feed portions to said non-earthed type antenna and the earthed type antenna are connected to coaxial lines for the respective antennas by one connector.

5. The antenna apparatus for a vehicle as claimed in claim 1, wherein the coaxial lines for the respective antennas connected to the respective feed portions to said non-earthed type antenna and the earthed type antenna are cramped on the part of the vehicle body at least in a part of the coaxial lines by a holding member.

6. The antenna apparatus for a vehicle as claimed in any one of claims 1, 2, 3, 4 and 5 wherein said constituent member made of an electrically non-conductive material is an outer panel of an opening and closing body for opening and closing an opening of the vehicle body.

7. The antenna apparatus for a vehicle as claimed in any one of claims 1, 2, 3, 4 and 5 wherein said constituent member made of an electrically non-conductive material is an air spoiler.

8. The antenna apparatus for a vehicle as claimed in any one of claims 1, 2, 3, 4 and 5 wherein said constituent member made of an electrically non-conductive material is a bumper face.

9. The antenna apparatus for a vehicle as claimed in any one of claims 1, 2, 3, 4 and 5 wherein said constituent member made of an electrically non-conductive material is a window portion.

10. The antenna apparatus for a vehicle as claimed in claim 9, wherein said antenna elements are mounted to a window glass of the window portion.

11. The antenna apparatus for a vehicle as claimed in any one of claims 1 , 2, 3, 4 and 5 wherein said electrically non-conductive material is a synthetic resin material.

12. The antenna apparatus for a vehicle as claimed in any one of claims 1, 2, 3, 4 and 5 wherein said antenna elements are arranged on an antenna substrate formed in a thin plate, and is mounted to a vehicle body member via said antenna substrate.

* * * * *